US007462418B2

(12) United States Patent
Matsumoto

(10) Patent No.: US 7,462,418 B2
(45) Date of Patent: Dec. 9, 2008

(54) ACCUMULATOR CELL ASSEMBLY

(75) Inventor: Kenji Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 646 days.

(21) Appl. No.: 10/526,431

(22) PCT Filed: Feb. 5, 2004

(86) PCT No.: PCT/JP2004/001217

§ 371 (c)(1), (2), (4) Date: Mar. 3, 2005

(87) PCT Pub. No.: WO2004/075320

PCT Pub. Date: Sep. 2, 2004

(65) Prior Publication Data

US 2006/0035140 A1 Feb. 16, 2006

(30) Foreign Application Priority Data

| | | |
|---|---|---|
| Feb. 20, 2003 | (JP) | 2003-043318 |
| Feb. 25, 2003 | (JP) | 2003-047328 |
| Feb. 25, 2003 | (JP) | 2003-047448 |

(51) Int. Cl.
*H01M 2/24* (2006.01)

(52) U.S. Cl. ........ 429/94; 429/160

(58) Field of Classification Search ........ 429/94, 429/160, 231.8
See application file for complete search history.

(56) References Cited

U.S. PATENT DOCUMENTS

| | | | | |
|---|---|---|---|---|
| 4,051,304 | A * | 9/1977 | Snook | 429/94 |
| 4,539,272 | A * | 9/1985 | Goebel | 429/94 |
| 6,287,719 | B1 * | 9/2001 | Bailey | 429/94 |
| 6,627,343 | B1 * | 9/2003 | Kim et al. | 429/94 |
| 2004/0258982 | A1 * | 12/2004 | Coffey et al. | 429/94 |

FOREIGN PATENT DOCUMENTS

| | | |
|---|---|---|
| EP | 0 771 038 A1 | 5/1997 |
| EP | 0 771 040 A2 | 5/1997 |
| EP | 0 822 605 A2 | 2/1998 |
| EP | 0 994 519 A2 | 4/2000 |
| JP | 4-341766 | 11/1992 |
| JP | 11-26321 | 1/1999 |
| JP | 11-339761 | 12/1999 |
| JP | 2000-138051 | 5/2000 |

* cited by examiner

*Primary Examiner*—Stephen J. Kalafut
(74) *Attorney, Agent, or Firm*—Arent Fox LLP

(57) ABSTRACT

An accumulator cell assembly made up of a plurality of accumulator cells connected in series. Each accumulator cell includes polarizing electrodes and a collector foil having a width of at least twice the width of the polarizing electrodes. The collector foil continues through adjacent accumulator cells and connects the adjacent accumulator cells in series.

5 Claims, 22 Drawing Sheets

(COMP. EX.)

(COMPARATIVE)

(EMBODIMENT)

(COMP. EX .1)

(COMP. EX .2)

(EMBODIMENT)

ACCUMULATOR CELL ASSEMBLY

CROSS-REFERENCE TO RELATED APPLICATION

This application is a National Stage entry of International Application No. PCT/JP2004/001217, filed Feb. 5, 2004. The disclosure of the prior application is hereby incorporated herein in its entirety by reference.

TECHNICAL FIELD

This invention relates to an accumulator cell assembly made by forming a plurality of accumulator cells by winding a positive electrode body and a negative electrode body separated by a separator onto a winding core and connecting the accumulator cells together in series.

BACKGROUND ART

A cylindrical battery made by connecting together in series a plurality of the accumulator cells which store electricity in batteries and condensers and the like is proposed for example in JP-A-11-26321. This cylindrical battery having a series accumulator cell connection structure of related art is shown in FIG. 23.

Referring to FIG. 23, a plurality of accumulator cells 301 configuring a cylindrical battery 300 are connected in series. The series-connected accumulator cells 301 are received in a cylindrical metal case 302.

Each of the accumulator cells 301 is a wound body made by forming polarizing electrodes on the faces of collector foils to form a positive electrode body and a negative electrode body and winding the positive electrode body and the negative electrode body separated by a separator into a roll.

The accumulator cells 301 each have a positive lead part 303 consisting of a part of the collector foil of the positive electrode body projecting from the polarizing electrodes and a negative lead part 304 consisting of a part of the collector foil of the negative electrode body projecting from the polarizing electrodes. That is, the accumulator cells 301 each have a positive lead part 303 at one end of the wound body and have a negative lead part 304 at the other end of the wound body.

By a plurality of these accumulator cells 301 being disposed on the same axis and the positive lead part 303 of one of the accumulator cells 301 being connected to the negative lead part 304 of another, the accumulator cells 301 are connected in series to form an accumulator cell unit 305. This accumulator cell unit 305 is received in a metal case 302 and a cylindrical battery 300 is thereby obtained.

However, with the cylindrical battery 300 of related art described above, to connect a plurality of the accumulator cells 301 in series, it is necessary to make the positive lead part 303 project from one end of each of the accumulator cells 301, make the negative lead part 304 project from the other end, and connect the positive lead parts 303 and the negative lead parts 304 of adjacent accumulator cells 301.

Here, if the length of the positive lead part 303 projecting from one end of each accumulator cell 301 is written La and the length of the negative lead part 304 projecting from the other end of the accumulator cell 301 is written Lb, then to connect a number of accumulator cells 301 in series it is necessary for the adjacent accumulator cells 301, 301 to be disposed with a spacing therebetween of La+Lb, the sum of the length La of the positive lead part 303 and the length Lb of the negative lead part 304.

Because adjacent accumulator cells 301, 301 are disposed with a spacing La+Lb like this, it is difficult to keep the overall length of the cylindrical battery 300 compact.

Also, because to connect multiple accumulator cells 301 in series the positive lead part 303 of one of adjacent accumulator cells 301, 301 is connected to the negative lead part 304 of the other accumulator cell 301, when a current flows, relatively large connection resistances arise at the connections, and it is difficult to make the resistance of these connections low.

Because of this, a series accumulator cell connection structure has been awaited with which it is possible to reduce the length of a cylindrical battery to make it compact and it is also possible to keep connection resistances low.

DISCLOSURE OF THE INVENTION

The present invention provides an accumulator cell assembly having a plurality of accumulator cells connected in series, each of the accumulator cells including: a collector foil; a polarizing electrode, made of activated carbon, a conducting material and a binder, provided on at least one side of the collector foil and forming a positive electrode body and a negative electrode body; a separator separating the positive electrode body and the negative electrode body; and a winding core for layering together and winding the collector foil, the polarizing electrode and the separator onto, wherein an extended collector foil having a width of at least twice the width of the polarizing electrode continues through adjacent accumulator cells and connects them in series.

By using an extended collector foil passing through adjacent accumulator cells and connecting the accumulator cells with the extended collector foil like this, it is possible to make the distance between adjacent accumulator cells short and make a cylindrical battery compact.

Also, by connecting adjacent accumulator cells in series with an extended collector foil, it is possible to eliminate the connection parts which have been necessary in related art for connecting accumulator cells together. By this means, connection resistance arising when a current flows can be eliminated and current flow improved.

To correct the voltages of a plurality of accumulator cells according to the invention individually, preferably, lead wires are connected to the extended collector foil. Even when accumulator cells are connected in series, it is desirable to keep the respective voltages of the accumulator cells constant. To achieve this, lead wires are connected to the extended collector foil to enable the voltages of the accumulator cells to be detected individually using the lead wires. Also, because the lead wires can be used to supply current or drain current, the voltages of the accumulator cells can be adjusted individually.

Preferably, the winding core of the invention is a hollow member and the lead wire is routed through the hollow part of this winding core. To connect a lead wire to an extended collector foil from the outer side of the accumulator cells it is necessary to form a through hole for the lead wire to pass through in the wall of the cylindrical container for receiving the accumulator cells, and this is undesirable. However, if the lead wire is routed through the insides of the accumulator cells using a hollow part of the winding core, as in the present invention, it is not necessary for a space for the lead wire to pass through to be newly provided.

Preferably, the extended collector foil of the invention has multiple openings formed in the part positioned between accumulator cells. When electrolyte is poured into the accumulator battery, the electrolyte passes through the openings, the electrolyte enters between the accumulator cells, and the electrolyte flows smoothly into the insides of the accumulator cells. Also, electrolyte collecting between the accumulator cells is chained through the openings and the amount of electrolyte staying between the accumulator cells can be reduced, so that the electrolyte divides into two droplets under surface tension and is prevented from forming liquid junctions between adjacent accumulator cells.

Also, of the extended collector foil of the invention, preferably, a water-repellency treatment is carried out on the part positioned between the accumulator cells. When this is done, even when electrolyte in the accumulator cells collects between the accumulator cells, the electrolyte is repelled by the water-repelling substance and the continuity of the electrolyte between the accumulator cells is broken, whereby liquid junctions between adjacent accumulator cells are prevented from being formed by the electrolyte.

BEST MODE FOR CARRYING OUT THE INVENTION

Figure 1:
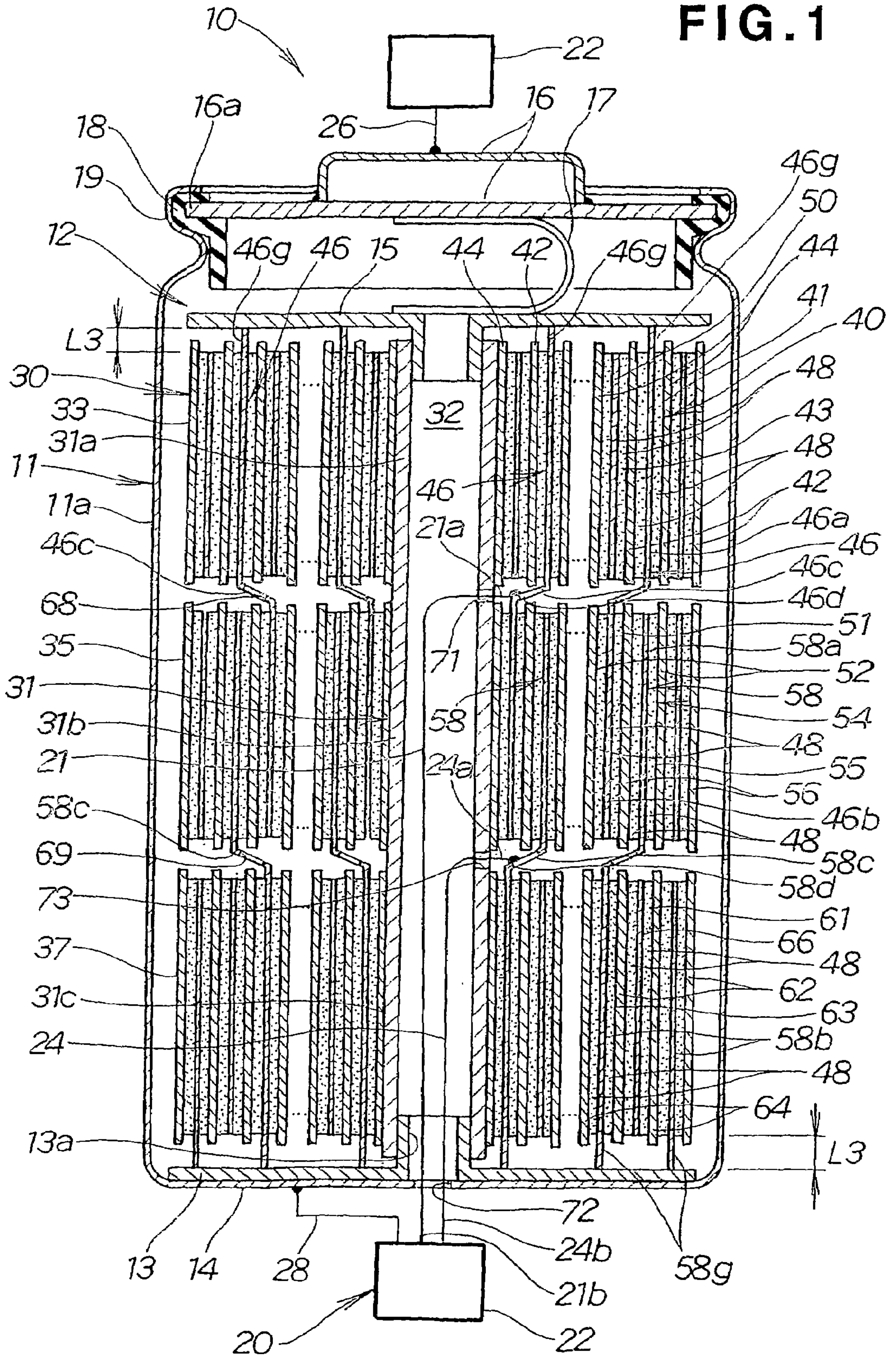
FIG. 1 is a sectional view of a cylindrical battery having a series-connected accumulator cell assembly according to a first embodiment of the invention.

A cylindrical battery 10 shown in FIG. 1 has a cylindrical container 11 and an accumulator unit 12 received in the cylindrical container 11. The accumulator unit 12 has a negative electrode collector plate 13 and a positive electrode collector plate 15. The negative electrode collector plate 13 is fixed to a bottom part 14 of the cylindrical container 11. The positive electrode collector plate 15 is connected by a conducting U-shaped connecting member 17 to a cover part 16 of the cylindrical container 11. The cover part 16 has an insulating rubber ring 18 fitted around its periphery 16*a*. The cover part 16 is attached to a top part 19 of the cylindrical container 11 by the top part 19 being crimped to the insulating rubber ring 18. The cylindrical battery 10 has voltage correcting means 20. The voltage correcting means 20 corrects the voltages of accumulator cells 33, 35, 37 constituting the accumulator unit 12. The cover part 16 serves as a positive electrode. The bottom part 14 of the cylindrical container 11 serves as a negative electrode.

The accumulator unit 12 has a series accumulator cell connection structure 30 disposed between the negative electrode collector plate 13 and the positive electrode collector plate 15.

The series accumulator cell connection structure 30 has a top accumulator cell 33 wound on a top part 31*a* of a hollow core 31, a middle accumulator cell 35 wound on a middle part 31*b* of the hollow core 31, and a bottom accumulator cell 37 wound on a bottom part 31*c* of the hollow core 31, and the three accumulator cells, the top accumulator cell 33, the middle accumulator cell 35 and the bottom accumulator cell 37, are connected in series.

The top accumulator cell 33 is a structure made by layering together a positive electrode body 41 of a first extended electrode body 40, a first top separator 42, a negative electrode body 43 and a second top separator 44 and winding this into a roll with the positive electrode body 41 and the negative electrode body 43 separated by the first and second top separators 42, 44.

The positive electrode body 41 of the first extended electrode body 40 is made up of a first extended collector foil 46 and polarizing electrodes 48, 48, consisting of activated carbon, a conducting material and a binder, provided on both sides of a positive electrode region 46*a* of the first extended collector foil 46.

The negative electrode body 43 of the top accumulator cell 33 is made up of a negative electrode collector foil 50 and polarizing electrodes 48, 48, consisting of activated carbon, a conducting material and a binder, provided on both sides of the collector foil 50.

The middle accumulator cell 35 is a structure made by layering together a negative electrode body 51 of the first extended electrode body 40, a first middle separator 52, a positive electrode body 55 of a second extended electrode body 54 and a second middle separator 56 and winding this into a roll with the negative electrode body 51 and the positive electrode body 55 separated by the first and second middle separators 52, 56.

The negative electrode body 51 of the first extended electrode body 40 is made up of the first extended collector foil 46 and polarizing electrodes 48, 48, consisting of activated carbon, a conducting material and a binder, provided on both sides of a negative electrode region 46*b* of the first extended collector foil 46.

The positive electrode body 55 of the second extended electrode body 54 is made up of a second extended collector foil 58 and polarizing electrodes 48, 48, consisting of activated carbon, a conducting material and a binder, provided on both sides of a positive electrode region 58*a* of the second extended collector foil 58.

The bottom accumulator cell 37 is a structure made by layering together a positive electrode body 61, a first bottom separator 62, a negative electrode body 63 of the second extended electrode body 54, and a second bottom separator 64 and winding this into a roll with the positive electrode body 61 and the negative electrode body 63 separated by the first and second bottom separators 62, 64.

The positive electrode body 61 of the bottom accumulator cell 37 is made up of a positive electrode collector foil 66 and polarizing electrodes 48, 48, consisting of activated carbon, a conducting material and a binder, provided on both sides of the positive electrode collector foil 66.

The negative electrode body 63 of the second extended electrode body 54 is made up of the second extended collector foil 58 and polarizing electrodes 48, 48, consisting of activated carbon, a conducting material and a binder, provided on both sides of a negative electrode region 58*b* of the second extended collector foil 58.

In this series accumulator cell connection structure 30, the top accumulator cell 33 and the middle accumulator cell 35 are connected in series by the single first extended collector foil 46 being used for both the collector foil of the positive electrode body 41 of the top accumulator cell 3*a* (i.e. the positive electrode region 46*a*) and the collector foil of the negative electrode body 51 of the middle accumulator cell 35 (i.e. the negative electrode region 46*b*), and the middle accumulator cell 35 and the bottom accumulator cell 37 are connected in series by the single second extended collector foil 58 being used for both the collector foil of the positive electrode body 55 of the middle accumulator cell 35 (i.e. the positive electrode region 58*a*) and the collector foil of the negative electrode body 63 of the bottom accumulator cell 37 (i.e. the negative electrode region 58*b*).

Also, in the series accumulator cell connection structure 30, the top end 46*g* of the positive electrode region 46*a* in the positive electrode body 41 of the top accumulator cell 33 is made to project above the first and second top separators 42, 44 and this projecting top end 46*g* is joined to the positive electrode collector plate 15, and the bottom end 58*g* of the negative electrode region 58*b* in the negative electrode body 63 of the bottom accumulator cell 37 is made to project below the first and second bottom separators 62, 64 and this projecting bottom end 58*g* is joined to the negative electrode collector plate 13.

Figure 2:
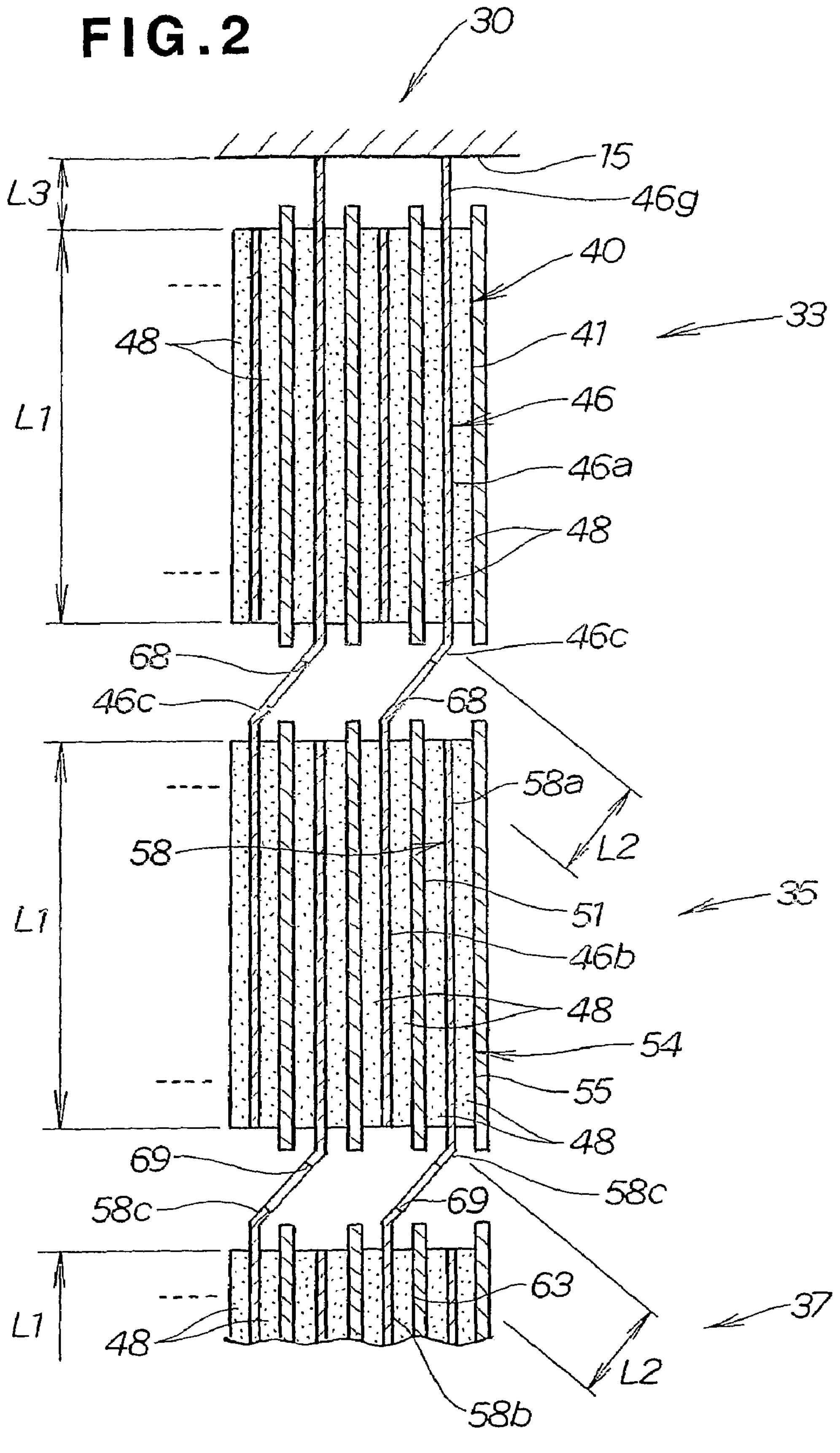
FIG. 2 is an enlarged view of the series accumulator cell connection structure shown in FIG. 1.

FIG. 2 is an enlarged view of the series accumulator cell connection structure 30 of the first embodiment of the invention shown in FIG. 1.

The positive electrode region 46*a* in the positive electrode body 41 of the top accumulator cell 33 is of width L1, the negative electrode region 46*b* in the negative electrode body 51 of the middle accumulator cell 35 is of width L1, a middle region 46*c* between the positive electrode region 46*a* and the negative electrode region 46*b* is of width L2, and the top end 46*g* of the positive electrode region 46*a* is of width L3, so that the overall width of the first extended collector foil 46 is L1+L1+L2+L3. First round holes 68 are formed as openings in the part between the top accumulator cell 33 and the middle accumulator cell 35, i.e. the middle region 46*c*, of the first extended collector foil 46.

That is, the first extended collector foil 46 has a width (specifically, 2×L1+L2+L3) of at least twice the width of the polarizing electrodes 48 and passes continuously through the adjacent top accumulator cell 33 and middle accumulator cell 35 commonly so as to connect these accumulator cells 33, 35 in series.

The first extended electrode body 40 is obtained by the polarizing electrodes 48, 48 being provided on the sides of the positive electrode region 46*a* and the negative electrode region 46*b* to form the positive electrode body 41 of the top accumulator cell 33 and the negative electrode body 51 of the middle accumulator cell 35. This first extended electrode body 40 does not have polarizing electrodes 48 on its middle region 46*c*. Also, the middle region 46*c* is bent so as to slope toward the hollow core 31 (see FIG. 1) with progress from the positive electrode region 46*a* to the negative electrode region 46*b*.

The positive electrode region 58*a* in the positive electrode body 55 of the middle accumulator cell 35 is of width L1, the negative electrode region 58*b* in the negative electrode body 63 of the bottom accumulator cell 37 is of width L1, a middle region 58*c* between the positive electrode region 58*a* and the negative electrode region 58*b* is of width L2, and the bottom end 58*g* of the negative electrode region 58*b* is of width L3 (see FIG. 1), so that the overall width of the second extended collector foil 58 is set to L1+L1+L2+L3.

That is, the second extended collector foil 58 has a width (specifically, 2×L1+L2+L3) of at least twice the width of the polarizing electrodes 48 and passes continuously through the adjacent middle accumulator cell 35 and bottom accumulator cell 37 so as to connect these accumulator cells 35, 37 in series.

Second round holes 69 are formed as openings in the part between the middle accumulator cell 35 and the bottom accumulator cell 37, i.e. the middle region 58*c*, of the second extended collector foil 58. These second round holes 69 are holes of the same shape as the first round holes 68 formed in the middle region 46*c* of the first extended collector foil 46.

The second extended electrode body 54 is obtained by the polarizing electrodes 48, 48 being provided on the positive electrode region 58*a* and the negative electrode region 58*b* to form the positive electrode body 55 of the middle accumulator cell 35 and the negative electrode body 63 of the bottom accumulator cell 37.

The second extended electrode body 54, like the first extended electrode body 40, does not have polarizing electrodes 48 on its middle region 58*c*. And the middle region 58*c* is bent so as to slope toward the hollow core 31 (see FIG. 1) with progress from the positive electrode region 58*a* to the negative electrode region 58*b*.

As described above, the first and second extended collector foils 46, 58 each have a width (specifically, 2×L1+L2+L3) of at least twice the width of the polarizing electrodes 48 and pass continuously through adjacent accumulator cells among the accumulator cells 33, 35 and 37 so as to connect the adjacent accumulator cells together in series. Consequently, the distances between the adjacent accumulator cells among the accumulator cells 33, 35 and 37 can be kept short and the length of the cylindrical battery 10 can be kept down to achieve compactness.

Also, by connecting the adjacent accumulator cells among the accumulator cells 33, 35 and 37 with the first and second extended collector foils 46 and 58 in series, it is possible to dispense with the connecting part that has been necessary for connecting the accumulator cells in related art. By this means it is possible to reduce the connection resistance arising when current flows and thereby improve current flow.

The reason for sloping the middle regions 46*c*, 58*c* of the first and second extended collector foils 46, 58 will be explained in detail with reference to FIG. 5A and FIG. 5B. Also, the reason for providing the first and second round holes 68, 69 as openings in the middle regions 46*c*, 58*c* will be explained with reference to FIG. 7A, FIG. 7B, FIG. 8A and FIG. 8B.

Referring, to FIG. 1, the voltage correcting means 20 is a structure made by connecting a first lead wire 21 to a part 46*d* on the hollow core 31 side of the middle region 46*c* of the first extended collector foil 46 and connecting the first lead wire 21 to a control part 22, connecting a second lead wire 24 to a part 58*d* on the hollow core 31 side of the middle region 58*c* of the second extended collector foil 58 and connecting the second lead wire 24 to the control part 22, connecting the cover part 16, serving as a positive electrode, to the control part 22 by a third lead wire 26, and connecting the bottom part 14 of the cylindrical container 11, serving as a negative electrode, to the control part 22 by a fourth lead wire 28.

The first lead wire 21 has a first end 21*a* connected to the part 46*d* on the hollow core 31 side of the middle region 46*c* of the first extended collector foil 46, passes through a first through hole 71 in the hollow core 31 into the hollow part 32 of the hollow core 31, passes through the hollow part 32 to an opening 13*a* in the negative electrode collector plate 13, passes through the opening 13*a* and a through hole 72 formed in the bottom part 14 of the cylindrical container 11 to outside the cylindrical battery 10, and has its second end 21*b* connected to the control part 22.

The second lead wire 24 has a first end 24*a* connected to the part 58*d* on the hollow core 31 side of the middle region 58*c* of the second extended collector foil 58, passes through a second through hole 73 in the hollow core 31 into the hollow part 32 of the hollow core 31, passes through the hollow part 32 to the opening 13*a* in the negative electrode collector plate 13, passes through the opening 13*a* and the through hole 72 formed in the bottom part 14 of the cylindrical container 11 to outside the cylindrical battery 10, and has its second end 24*b* connected to the control part 22.

As a result of the first and second lead wires 21, 24 being routed through the hollow part 32 of the hollow core 31 like this, it is not necessary for a space for the first and second lead wires 21, 24 to pass through to be newly provided. Consequently, the installing of the first and second lead wires 21, 24 can be carried out simply and quickly.

Also, as a result of the first and second lead wires 21, 24 being routed through the insides of the top accumulator cell 33, the middle accumulator cell 35 and the bottom accumulator cell 37 using the hollow part 32 of the hollow core 31, it is not necessary to prove through holes for passing through the first and second wires 21, 24 in the wall 11*a* of the cylindrical container 11 housing the accumulator cells 33, 35 and 37.

With this voltage correcting means 20, it is possible to correct the voltages of the top accumulator cell 33, the middle accumulator cell 35 and the bottom accumulator cell 37 individually by supplying current to or discharging the accumulator cells 33, 35 and 37 individually via the first through fourth lead wires 21, 24, 26 and 98.

Figure 3:
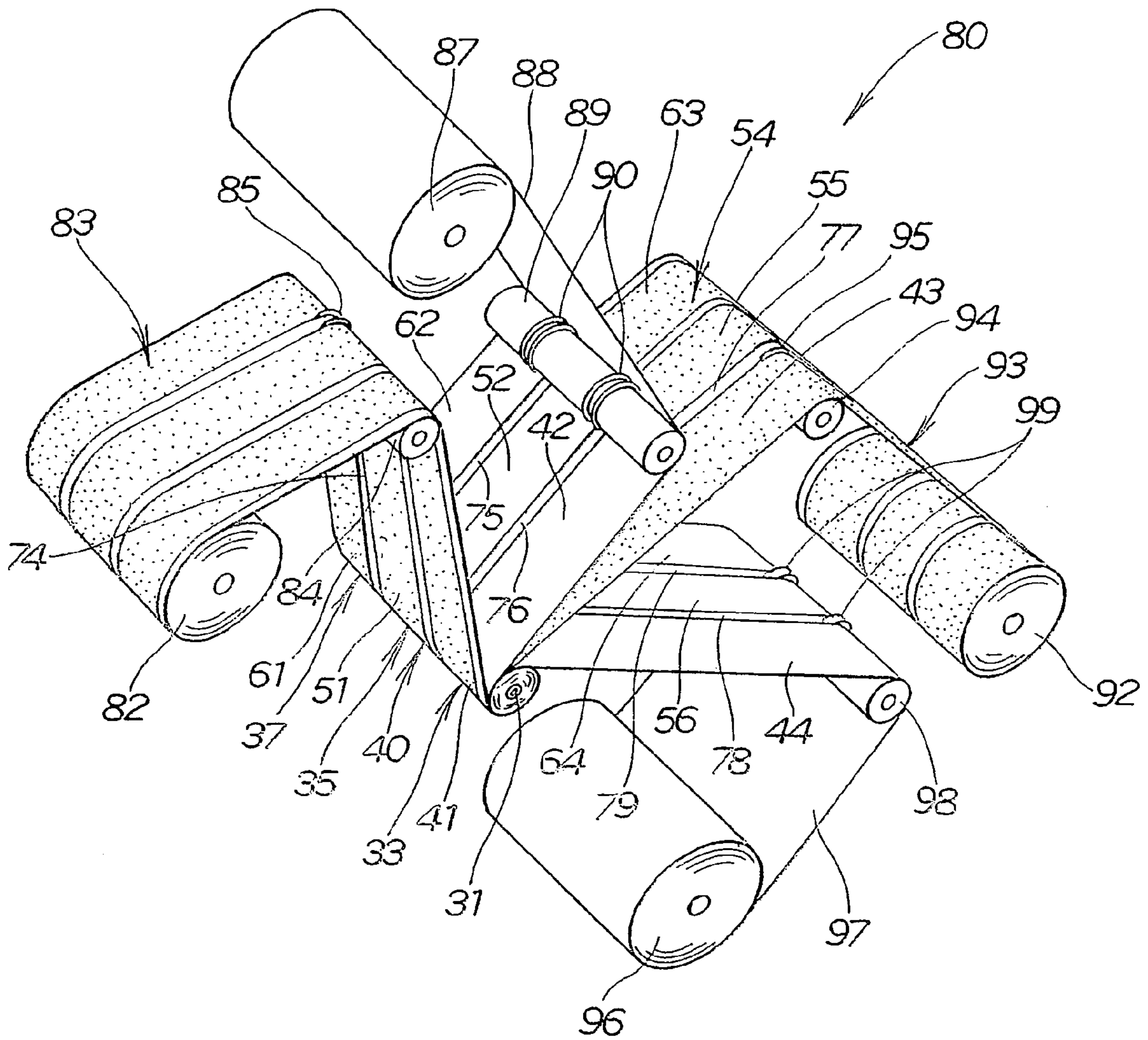
FIG. 3 is a perspective view showing an apparatus for manufacturing the series accumulator cell connection structure shown in FIG. 2.

FIG. 3 shows an apparatus for manufacturing a series accumulator cell connection structure according to the first embodiment of the invention.

This apparatus 80 for manufacturing a series accumulator cell connection structure includes a first electrode sheet feed roller 82 for feeding out a first electrode sheet 83 in the form of a ribbon. The first electrode sheet 83 fed out is cut by a cutter 85 of a first electrode sheet cutting roller 84 and thereby divided into a first extended electrode body 40 and the positive electrode body 61 for the bottom accumulator cell 37 shown in FIG. 1. At the time of this division, an unwanted part 74 arises between the first extended electrode body 40 and the positive electrode body 61; this part 74 is removed by removing means (not shown).

The manufacturing apparatus 80 also includes a first separator feed roller 87 for feeding out a first separator 88 in the form of a ribbon. The first separator 88 fed out is cut by cutters 90, 90 of a first separator cutting roller 89 and thereby divided into the first top separator 42 for the top accumulator cell 33 shown in FIG. 1, the first middle separator 52 for the middle accumulator cell 35 shown in FIG. 1, and the first bottom separator 62 for the bottom accumulator cell 37 shown in FIG. 1. At the time of this division, unwanted parts 75, 76 arise between the separators 42, 52 and 62; these parts 75, 76 are removed by removing means (not shown).

Also, the manufacturing apparatus 80 includes a second electrode sheet feed roller 92 for feeding out a second electrode sheet 93 in the form of a ribbon. The second electrode sheet 93 fed out is cut by a cutter 95 of a second electrode sheet cutting roller 94 and thereby divided into a negative electrode body 43 for the top accumulator cell 33 and a second extended electrode body 54. At the time of this division, an unwanted part 77 arises between the negative electrode body 43 and the second extended electrode body 54; this part 77 is removed by removing means (not shown).

Also, the manufacturing apparatus 80 includes a second separator feed roller 96 for feeding out a second separator 97 in the form of a ribbon. The second separator 97 fed out is cut by cutters 99, 99 of a second separator cutting roller 98 and thereby divided into a second top separator 44 for the top accumulator cell 33 shown in FIG. 1, a second middle separator 56 for the middle accumulator cell 35 shown in FIG. 1, and the second bottom separator 64 for the bottom accumulator cell 37 shown in FIG. 1. At the time of this division, unwanted parts 78, 79 arise between the separators 44, 56 and 64; these parts 78, 79 are removed by removing means (not shown).

The positive electrode body 41 of the first extended electrode body 40 cut by the cutter 85 of the first electrode sheet cutting roller 84, the first top separator 42 cut by the cutters 90 of the first separator cutting roller 39, the negative electrode body 43 cut by the cutter 95 of the second electrode sheet cutting roller 94 and the second top separator 44 cut by the cutters 99 of the second separator cutting roller 98 are layered together and wound onto a hollow core 31 to form a top accumulator cell 33 (see also FIG. 1).

The negative electrode body 51 of the first extended electrode body 40 cut by the cutter 85 of the first electrode sheet cutting roller 84, the first middle separator 52 cut by the cutters 90 of the first separator cutting roller 89, the positive electrode body 55 of the second extended electrode body 54 cut by the cutter 95 of the second electrode sheet cutting roller 94, and the second middle separator 56 cut by the cutters 99 of the second separator cutting roller 98 are layered together and wound onto the hollow core 31 to form a middle accumulator cell 35 (see also FIG. 1).

The positive electrode body 61 cut by the cutter 85 of the first electrode sheet cutting roller 84, the first bottom separator 62 cut by the cutters 90 of the first separator cutting roller 89, the negative electrode body 63 of the second extended electrode body 54 cut by the cutter 95 of the second electrode sheet cutting roller 94, and the second bottom separator 64 cut by the cutters 99 of the second separator cutting roller 98 are layered together and wound onto the hollow core 31 to form a bottom accumulator cell 37 (see also FIG. 1).

Figure 4:
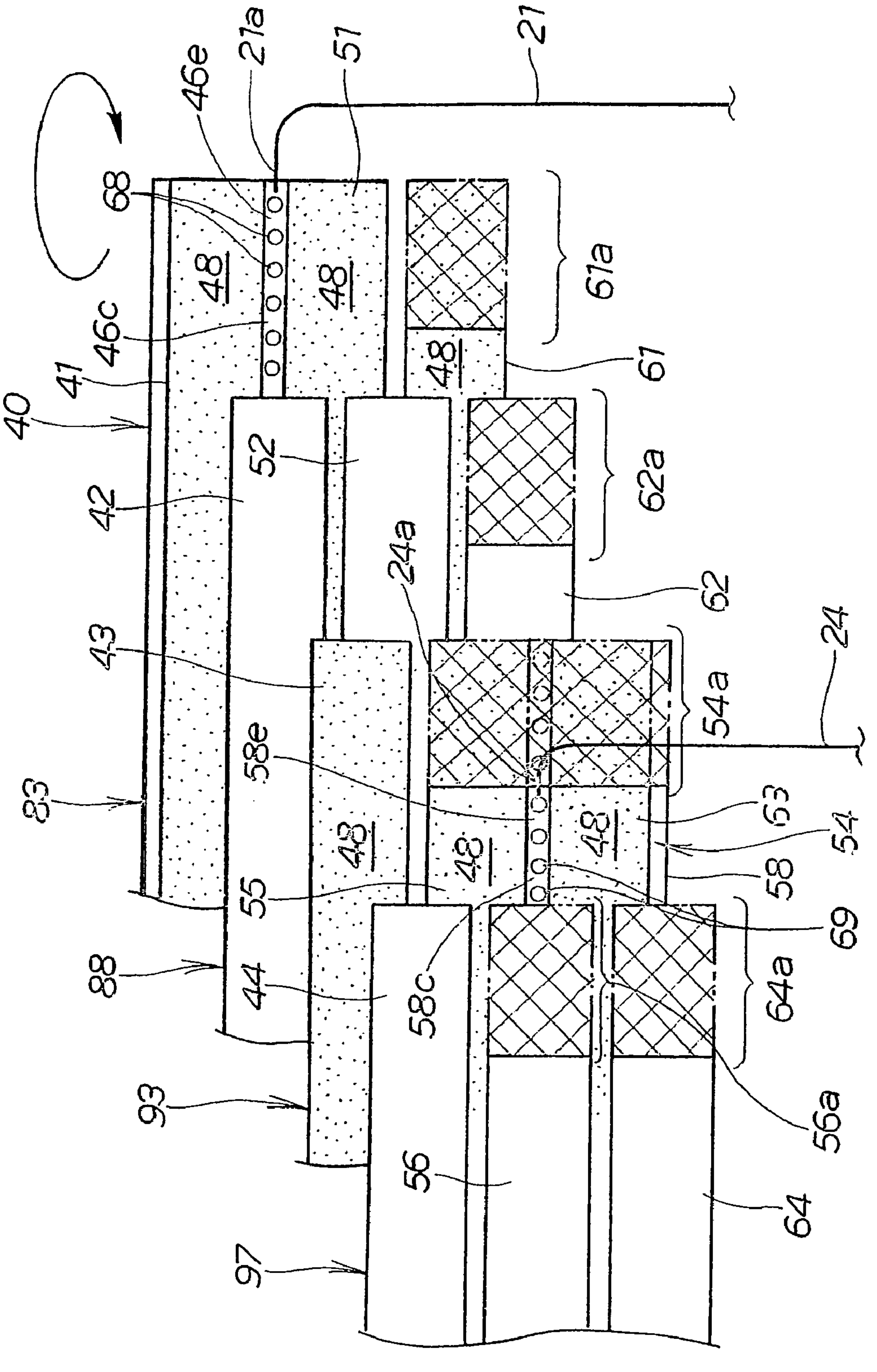
FIG. 4 is a view showing electrode bodies and separators of the series accumulator cell connection structure shown in FIG. 2 before they are wound on a winding core.

FIG. 4 shows the electrode sheets and separators shown in FIG. 3 before they are wound onto the hollow core.

The positive electrode body 41 of the first extended electrode body 40 of the first electrode sheet 83, the first top separator 42 of the first separator 88, the negative electrode body 43 of the second electrode sheet 93 and the second top separator 44 of the second separator 97 are layered together.

Also, the negative electrode body 51 of the first extended electrode body 40, the first middle separator 52 of the first separator 38, the positive electrode body 55 of the second extended electrode body 54 of the second electrode sheet 93, and the second middle separator 56 of the second separator 97 are layered together.

And the positive electrode body 61 of the first electrode sheet 83, the first bottom separator 62 of the first separator 88, the negative electrode body 63 of the second extended electrode body 54 and the second bottom separator 64 of the second separator 97 are layered together.

Here, as the first and second electrode sheets 83, 93 and the first and second separator sheets 88, 97 are layered together and wound onto the hollow core shown in FIG. 3 as shown with an arrow, one wind 61*a* (the hatched region) of the positive electrode body 61 of the first electrode sheet 83 is removed; one wind 62*a* (the hatched region) of the first bottom separator 62 of the first separator 88 is removed; one wind 54*a* (the hatched region) of the second extended electrode body 54 of the second electrode sheet 93 is removed; one wind 56*a* (the hatched region) of the second middle separator 56 of the second separator 97 is removed; and one wind 64*a* (the hatched region) of the second bottom separator 64 is removed.

The first end 21*a* of the first lead wire 21 is connected to the leading end 46*e* of the middle region 46*c* of the first extended collector foil 46 (see FIG. 2) of the first extended electrode body 40.

After the one wind 54*a* of the leading end of the second extended electrode body 54 is removed, the first end 24*a* of the second lead wire 24 is connected to the leading end 58*e* of the middle region 58*c* of the second extended collector foil 58 of the second extended electrode body 54.

Multiple first round holes 68 (see also FIG. 1 and FIG. 2) are formed with a predetermined spacing in the middle region 46*c* of the first extended collector foil 46. Multiple second round holes 69 (see also FIG. 1 and FIG. 2) are formed with a predetermined spacing in the middle region 58*c* of the second extended collector foil 58.

By the first and second electrode sheets 83, 93 and the first and second separator sheets 88, 97 being layered together in this state and wound onto the hollow core 31 shown in FIG. 3 in the direction shown by the arrow, the series accumulator cell connection structure 30 shown in FIG. 1 is obtained.

Next, on the basis of FIG. 4, FIG. 5A and FIG. 5B, an example of layering together and winding first and second electrode sheets 83, 93 and the first and second separator sheets 88, 97 onto the hollow core 31 will be described in detail.

Figure 5A:
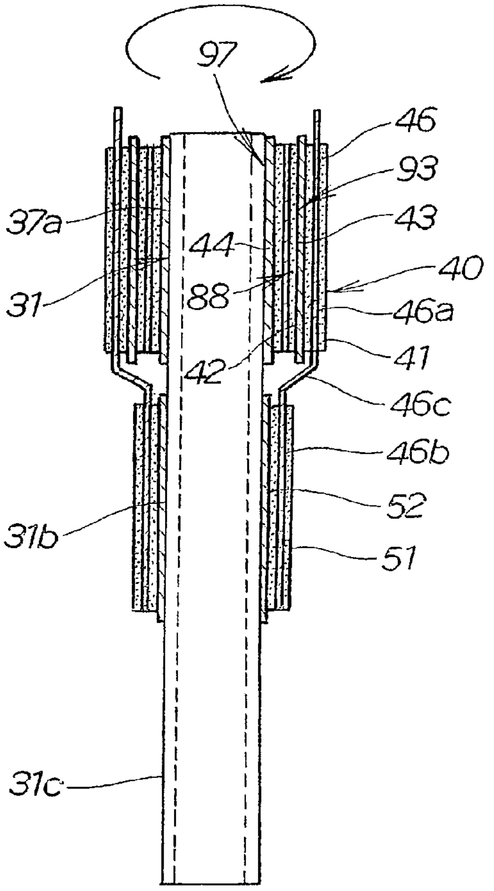
FIG. 5A and FIG. 5B are views showing how the electrode bodies and separators shown in FIG. 3 are wound on a core a number of times to obtain a series accumulator cell connection structure.

As shown in FIG. 5A, a first winding is carried out as shown by the arrow with the first and second electrode sheets 83, 93 (see FIG. 4) and the first and second separator sheets 88, 97 (see FIG. 4) layered together. By this means, the second top separator 44 of the second separator 97, the negative electrode body 43 of the second electrode sheet 93, the first top separator 42 of the first separator 88 and the positive electrode body 41 of the first extended electrode body 40 are wound on the top part 31*a* of the hollow core 31 in a stacked state.

Because single winds 54*a*, 56*a* of the second extended electrode body 54 and the second middle separator 56 have been removed as mentioned above with reference to FIG. 4, on the middle part 31*b* of the hollow core 31 shown in FIG. 5A, the first middle separator 52 and the negative electrode body 51 of the first extended electrode body 40 are wound in a stacked state. As a result, the middle region 46*c* of the first extended collector foil 46 slopes toward the hollow core 31 with progress from the positive electrode region 46*a* (that is, the positive electrode body 41) to the negative electrode region 46*b* (the negative electrode body 51), and the polarities of the wound electrode bodies match along the hollow core 31.

Also, because single winds 61*a*, 62*a* 52*a* and 64*a* have been removed from the positive electrode body 61 of the first electrode sheet 83, the first bottom separator 62 of the first separator 88, the second extended electrode body 54 of the second electrode sheet 93 and the second bottom separator 64 of the second separator 97 respectively, as mentioned above with reference to FIG. 4, nothing is wound on the bottom part 31*c* of the hollow core 31.

Figure 5B:
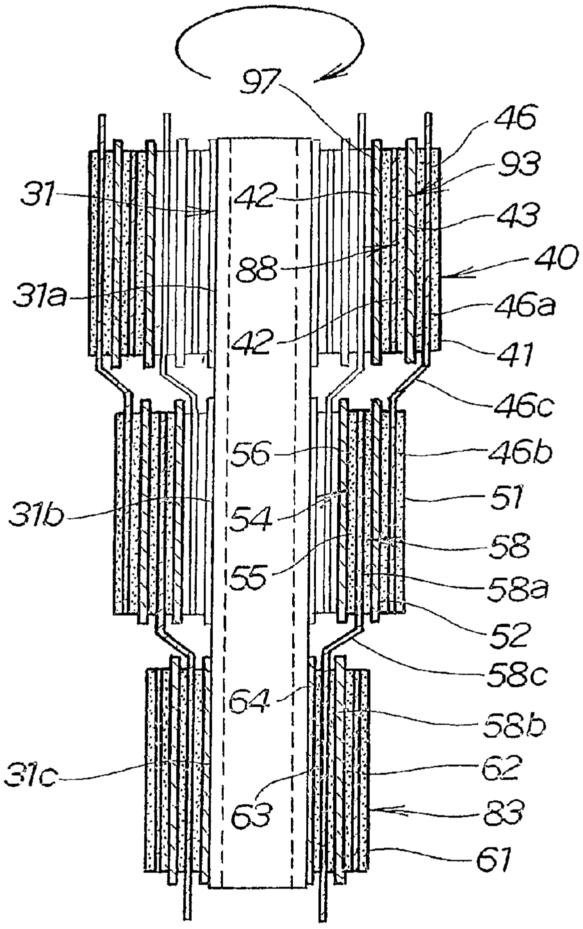

In FIG. 5B, a second winding is carried out as shown by the arrow with the first and second electrode sheets 83, 93 (see FIG. 4) and the first and second separator sheets 88, 97 (see FIG. 4) layered together.

On the top part 31*a* of the hollow core 31, the second top separator 44 of the second separator 97, the negative electrode body 43 of the second electrode sheet 93, the first top separator 42 of the first separator 88 and the positive electrode body 41 of the first extended electrode body 40 are wound again.

And on the middle part 31*b* of the hollow core 31, the second middle separator 56 of the second separator 97, the positive electrode body 55 of the second extended electrode body 54, the first middle separator 52 of the first separator 88 and the negative electrode body 51 of the first extended electrode body 40 are wound again.

As a result, the middle region 46*c* of the first extended collector foil 46 slopes toward the hollow core 31 with progress from the positive electrode region 46*a* (the positive electrode body 41) to the negative electrode region 46*b* (the negative electrode body 51), and the polarities of the wound electrode bodies match along the hollow core 31.

Also, the second bottom separator 64 of the second separator 97, the negative electrode body 63 of the second extended electrode body 54, the first bottom separator 62 of the first separator 88 and the positive electrode body 61 of the first electrode sheet 83 are wound on the bottom part 31*c* of the hollow core 31.

As a result, the middle region 58*c* of the second extended collector foil 58 slopes toward the hollow core 31 with progress from the positive electrode region 58*a* (the positive electrode body 55) to the negative electrode region 58*b* (the negative electrode body 63), and the polarities of the wound electrode bodies match along the hollow core 31.

Thereafter, by winding being continued as shown by the arrow with the first and second electrode sheets 83, 93 (see FIG. 4) and the first and second separator sheets 88, 97 (see FIG. 4) in a stacked state, the series accumulator cell connection structure 30 shown in FIG. 1 is obtained.

As a result of the middle region 46*c* of the first extended collector foil 46 and the middle region 58*c* of the second extended collector foil 58 being made to slope like this, the winding orders of the positive and negative electrodes constituting the top accumulator cell 33, the middle accumulator cell 35 and the bottom accumulator cell 37 are matched along the hollow core 31.

Specifically, as shown in the cylindrical battery 10 of FIG. 1, by the middle region 46*c* of the first extended collector foil 46 and the middle region 58*c* of the second extended collector foil 58 being made to slope diagonally, the top accumulator cell 33, the middle accumulator cell 35 and the bottom accumulator cell 37 are wound so that the first wind on the hollow core 31 is a negative electrode and the last wind is a negative electrode (see FIG. 1).

Here, when the first wind on the hollow core 31 is made a negative electrode, the last wind becomes a positive electrode; but by removing the positive electrode wound outermost, the last wind can be made a negative electrode (see FIG. 1).

By winding being carried out like this, all the electrodes of the top accumulator cell 33, the middle accumulator cell 35 and the bottom accumulator cell 37 can be matched up as negative electrodes or positive electrodes Consequently, the effect that the top accumulator cell 33, the middle accumulator cell 35 and the bottom accumulator cell 37 do not lose electrochemical stability is obtained The reason for making the first wind and the last wind on the hollow core 31 negative electrodes (see FIG. 1) here is as follows.

It is generally known that when the first wind or the last wind of the top accumulator cell 33, the middle accumulator cell 35 and the bottom accumulator cell 37 is a positive electrode, separator carbonization and the like tend to occur. In this first embodiment, to suppress separator carbonization and the like efficiently, the top accumulator cell 33, the middle accumulator cell 35 and the bottom accumulator cell 37 are wound on the hollow core 31 so that the first wind and the last wind of each of the accumulator cells 33, 35 and 37 are negative electrodes.

In FIG. 3 through FIG. 5B, an example was shown wherein the first separator 88 is stacked on the first electrode sheet 83, the second electrode sheet 93 is stacked on the first separator 88 and the second separator 97 is stacked on the second electrode sheet 93 in turn; however, the method of layering together these members 83, 88, 93 and 97 can be chosen freely. In short, any method by which it is possible to layer together the members 83, 88, 93 and 97 so that they can be wound with the positive electrode bodies and the negative electrode bodies separated by the separators can be used.

Figure 6:
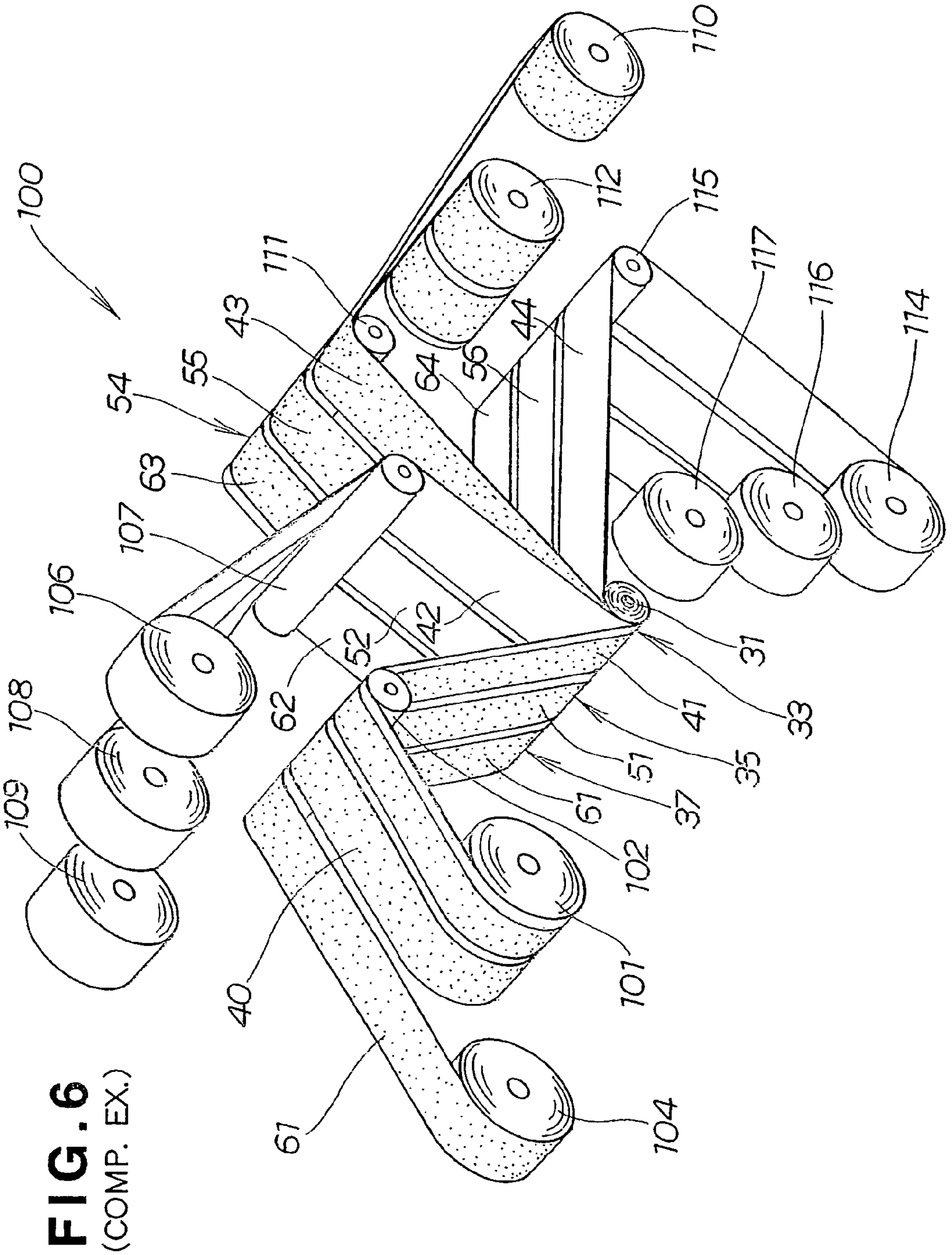
FIG. 6 is a view showing an example for comparison with the manufacturing apparatus shown in FIG. 3 for manufacturing the series accumulator cell connection structure shown in FIG. 2.

FIG. 6 shows an example for comparison with the method of manufacturing a series accumulator cell connection structure according to the first embodiment of the invention shown in FIG. 3.

In an apparatus 100 of a comparison example for manufacturing a series accumulator cell connection structure, a first extended electrode body 40 in the form of a ribbon is fed out from a first extended electrode body feed roller 101 to the hollow core 31 via a first roller 102, and a positive electrode body 61 in the form of a ribbon is fed out from a negative electrode body feed roller 104 to the hollow core 31 via the first roller 102.

Also, in this manufacturing apparatus 100, a first top separator 42 in the form of a ribbon is fed out from a first upper separator feed roller 106 to the hollow core 31 via a second roller 107, a first middle separator 52 in the form of a ribbon is fed out from a first middle separator feed roller 108 to the hollow core 31 via the second roller 107, and a first bottom separator 62 in the form of a ribbon is fed out from a first bottom separator feed roller 109 to the hollow core 31 via the second roller 107.

Also, in the manufacturing apparatus 100, a negative electrode body 43 in the form of a ribbon is fed out from a negative electrode body feed roller 110 to the hollow core 31 via a third roller 111, and a second extended electrode body 54 in the form of a ribbon is fed out from a second extended electrode body feed roller 112 to the hollow core 31 via the third roller 111.

Also, in the manufacturing apparatus 100, a second top separator 44 in the form of a ribbon is fed out from a second top separator feed roller 114 to the hollow core 31 via a fourth roller 115, a second middle separator 56 in the form of a ribbon is fed out from a second middle separator feed roller 116 to the hollow core 31 via the fourth roller 115, and a second bottom separator 64 in the form of a ribbon is fed out from a second bottom separator feed roller 117 to the hollow core 31 via the fourth roller 115.

By the positive electrode body 41 of the first extended electrode body 40, the first top separator 42, the negative electrode body 43 for the top accumulator cell 33 and the second top separator 44 being layered together and wound onto the top part 31*a* of the hollow core 31 (see FIG. 1), a top accumulator cell 33 is formed.

By the negative electrode body 51 of the first extended electrode body 40, the first middle separator 52, the positive electrode body 55 of the second extended electrode body 54 and the second middle separator 56 being layered together and wound onto the middle part 31*b* of the hollow core 31 (see FIG. 1), a middle accumulator cell 35 is formed.

And by the positive electrode body 61 for the bottom accumulator cell 37, the first bottom separator 62, the negative electrode body 63 of the second extended electrode body 54 and the second bottom separator 64 being layered together and wound onto the bottom part 31*c* of the hollow core 31 (see FIG. 1), a bottom accumulator cell 37 is formed.

The manufacturing method using the manufacturing apparatus 80 of the present embodiment shown in FIG. 3 and the manufacturing method using the manufacturing apparatus 100 in the comparison example shown in FIG. 6 will now be compared.

With the comparison example shown in FIG. 6, ten rollers, the first extended electrode body feed roller 101, the positive electrode body feed roller 104, the first upper separator feed roller 106, the first middle separator feed roller 108, the first bottom separator feed roller 109, the negative electrode body feed roller 110, the second extended electrode body feed roller 112, the second top separator feed roller 114, the second middle separator feed roller 116 and the second bottom separator feed roller 117, are necessary.

Also, in this comparison example, as well as it being necessary to control the end faces of the positive and negative electrode bodies, the first and second extended electrode bodies and the separators individually as the positive and negative electrode bodies, the first and second extended electrode bodies and the separators are fed out from the respective feed rollers, it is necessary to ensure the flatness of each of the positive and negative electrode bodies, the first and second extended electrode bodies and the separators individually.

Therefore, in the comparison example, each of the ten feed rollers must be individually equipped with means for controlling the end face and means for ensuring flatness, and each of the feed rollers becomes costly. Consequently, when the number of feed rollers increases, plant costs increase greatly.

Also, when the number of feed rollers increases, time and labor are used up in roller interchanges, and this constitutes an impediment to raising productivity.

With the first embodiment shown in FIG. 3, on the other hand, the number of feed rollers can be reduced to four: the first electrode sheet feed roller 82, the first separator feed roller 87, the second electrode sheet feed roller 92 and the second separator feed roller 96.

By reducing the number of feed rollers to four like this, it is possible to keep plant costs down. Also, by reducing the number of feed rollers, it is possible to reduce the amount of time spent on roller interchanges and to raise productivity.

Next, the operation of the series accumulator cell connection structure 30 will be described, on the basis of FIG. 7A, FIG. 7B, FIG. 8A and FIG. 8B.

Figure 7B:
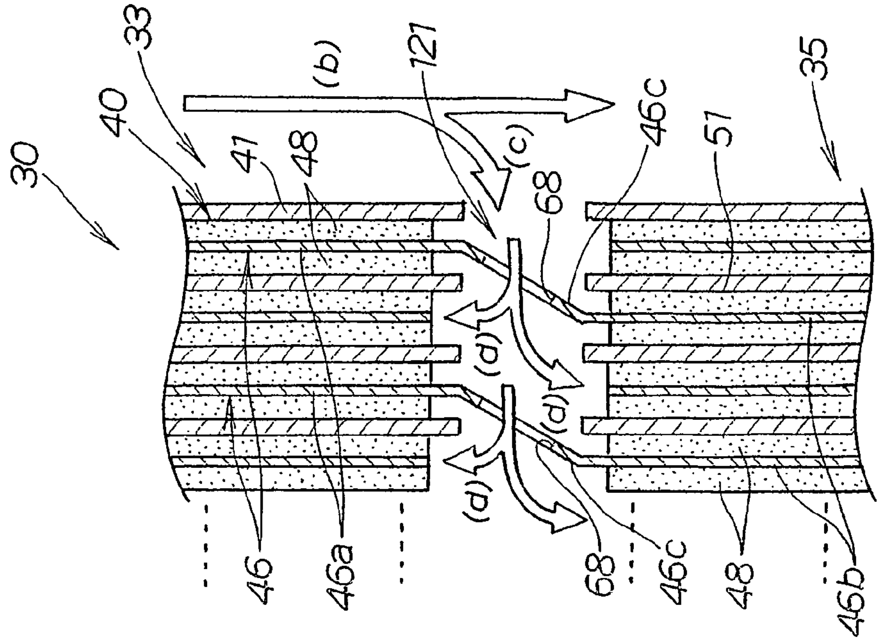
FIG. 7A and FIG. 7B are views showing how electrolyte flows when poured into a cylindrical casing in which an accumulator cell unit has been received.
Figure 7A:
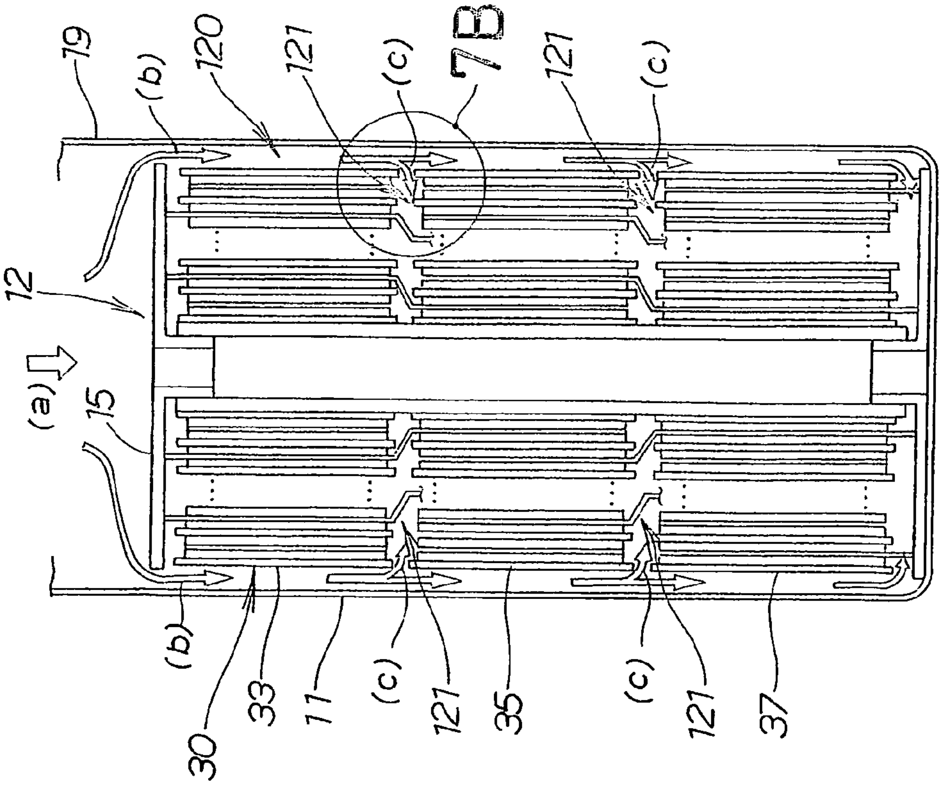

FIG. 7A and FIG. 7B show an example of an electrolyte being supplied to the inside of a series accumulator cell connection structure 30 according to the first embodiment.

Referring to FIG. 7A, with the top part 19 of the cylindrical container 11 open, the accumulator unit 12 is received into the cylindrical container 11 through this opening. After that, an electrolyte is supplied through the opening in the top part 19 as shown by the arrow (a).

The supplied electrolyte passes through a gap between the positive electrode collector plate 15 and the cylindrical container 11 and enters a gap 120 between the series accumulator cell connection structure 30 and the cylindrical container 11 as shown by the arrows (b).

The electrolyte entering the gap 120 proceeds into a gap 121 between the top accumulator cell 33 and the middle accumulator cell 35 and a gap 121 between the middle accumulator cell 35 and the bottom accumulator cell 37, as shown by the arrows (c).

In FIG. 7B, the electrolyte passes through a plurality of the first round holes 68 formed in the middle region 46*c* of the first extended collector foil 46 as shown by the arrows (d) and flows smoothly through the bottom end of the top accumulator cell 33 into the inside of the top accumulator cell 33 (that is, between the electrode bodies and the separators) and flows through the top end of the middle accumulator cell 35 into the inside of the middle accumulator cell 35 (that is, between the electrode bodies and the separators).

Also, electrolyte passes through a plurality of the second round holes 69 formed in the middle region 58*c* of the second extended collector foil 58 similarly to the middle region 46*c* of the first extended collector foil 46, as shown in FIG. 2, flows through the bottom end of the middle accumulator cell 35 into the inside of the middle accumulator cell 35 (that is, between the electrode bodies and the separators), and flows through the top end of the bottom accumulator cell 37 into the inside of the bottom accumulator cell 37 (that is, between the electrode bodies and the separators).

As a result, even though the middle accumulator cell 35 is disposed between the top and bottom accumulator cells 33, 37, the electrolyte can be poured smoothly through the top and bottom ends of the middle accumulator cell 35. Consequently, the electrolyte can be poured evenly into the insides of the top accumulator cell 33, the middle accumulator cell 35 and the bottom accumulator cell 37.

Next, a liquid junction formed by electrolyte in a series accumulator cell connection structure 30 according to the first embodiment will be described, on the basis of the comparison example shown in FIG. 8A and the embodiment shown in FIG. 8B.

Figure 8A:
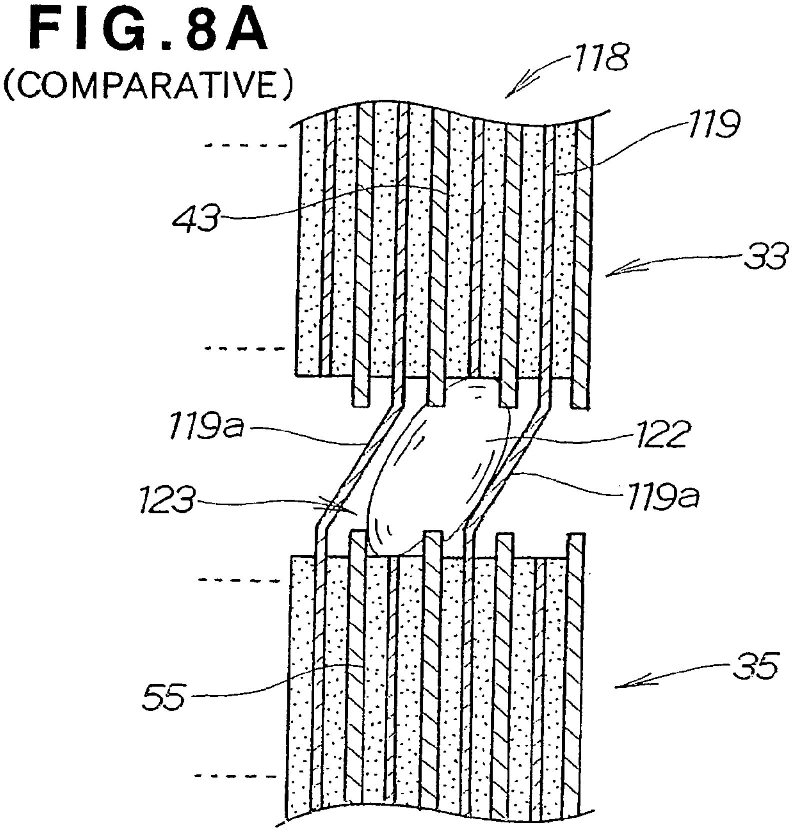
FIG. 8A and FIG. 8B are views showing a comparison example and an embodiment of the invention when electrolyte has stayed between accumulator cells.

A comparison example of a series accumulator cell connection structure 118 shown in FIG. 8A does not have multiple first round holes in the middle region 119*a* of its first extended collector foil 119. Consequently, when electrolyte 122 poured into the inside of the top accumulator cell 33 and the middle accumulator cell 35 collects in the space 123 between middle regions 119*a*, due to surface tension it forms a continuous droplet. Consequently, it makes contact with the negative electrode body 43 of the top accumulator cell 33 and the positive electrode body 55 of the middle accumulator cell 35 and forms a liquid junction.

Figure 8B:
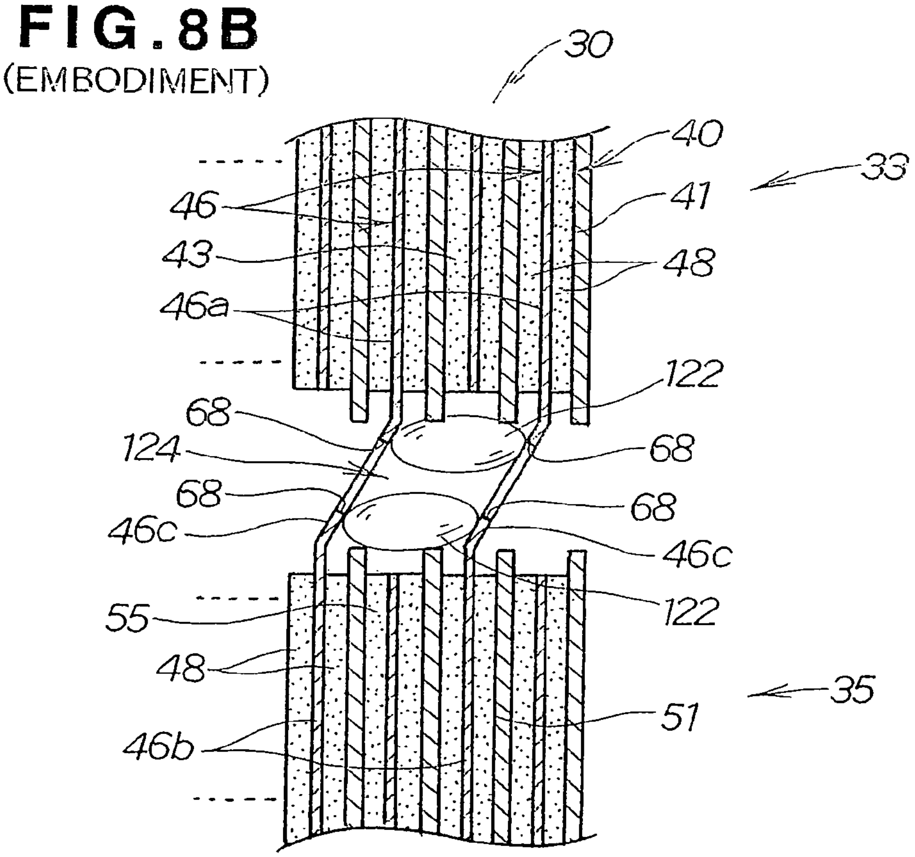

The structure 30 of the present embodiment shown in FIG. 8B has multiple first round holes 68 formed in the middle region 46*c* of the first extended collector foil 46. Because of this, even if electrolyte 122 poured into the inside of the top accumulator cell 33 and the middle accumulator cell 35 collects in the space 124 between the first extended collector foils 46, 46 (that is, middle regions 46*c*, 46*c*), it drains out through the first round holes 68. Consequently, the amount of electrolyte 122 staying in the space 124 between the top accumulator cell 33, the middle accumulator cell 35 and the middle region 46*c* can be reduced. As a result, under surface tension the electrolyte 122 divides into upper and lower parts and two droplets are formed, and the electrolyte 122 is prevented from forming a liquid junction between the negative electrode body 43 of the top accumulator cell 33 and the positive electrode body 55 of the middle accumulator cell 35.

Here, the size of the first round holes 68 formed in the middle region 46*c* is set to a size such that electrolyte 122 collecting in the space 124 does not become continuous.

The same effect as that of forming the multiple first round holes 68 in the middle region 46*c* can be obtained by means of the multiple second round holes 69 formed in the middle region 58*c* of the second extended collector foil 58 as shown in FIG. 1 and FIG. 2.

Next, first, second and third variations of the first extended collector foil 46 will be described, on the basis of FIG. 9, FIG. 10 and FIG. 11. In the description of these first through third variations, parts the same as parts already described with reference to FIG. 1 through FIG. 8 have been given the same reference numerals and will not be described again.

Figure 9:
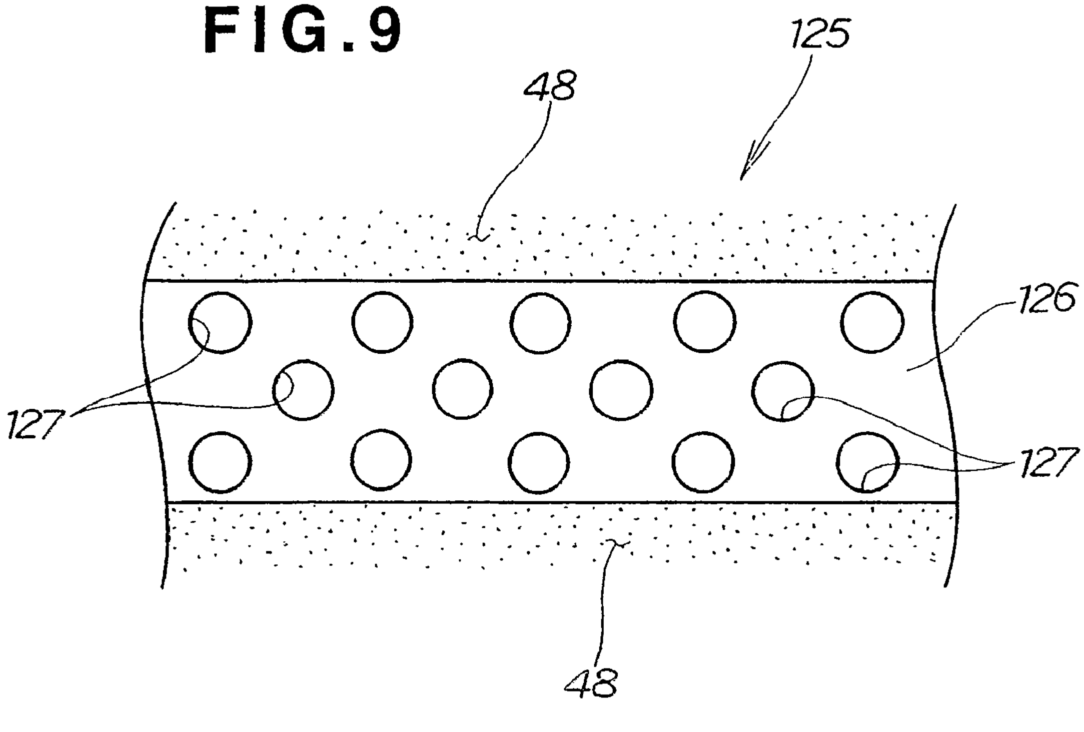
FIG. 9 is a view showing a first variation of a first extended collector foil of the first embodiment, and shows an example wherein multiple round holes are formed in a zigzag in a middle region of the first extended collector foil.

FIG. 9 shows a first variation of the first extended collector foil.

The first extended collector foil 125 of this first variation differs only from the first extended collector foil 46 (see FIG. 4) in the point that multiple round holes (openings) 127 are formed in the middle region 126 in a zigzag, and otherwise its construction is the same as that of the first extended collector foil 46.

By disposing the multiple round holes 127 in the middle region 126 in a zigzag, it is possible to arrange the round holes 127 efficiently in the middle region 196 and provide a large area of holes. Therefore, the pouring of electrolyte described with reference to FIG. 7A and FIG. 7B can be carried out more efficiently. Also, the electrolyte can be prevented from forming the liquid junctions described with reference to FIG. 8B more effectively.

In FIG. 9, just the first extended collector foil 125 is shown, but round holes are also arranged in a zigzag in the second extended collector foil (not shown), in the same way as in the first extended collector foil 125.

Although in the first embodiment and the first variation, examples were described wherein openings consisting of round holes 68, 127 were formed in the middle region 46*c* (see FIG. 4) and the middle region 126, the shape of the openings is not limited to this, and some other shape can alternatively be employed.

Figure 10:
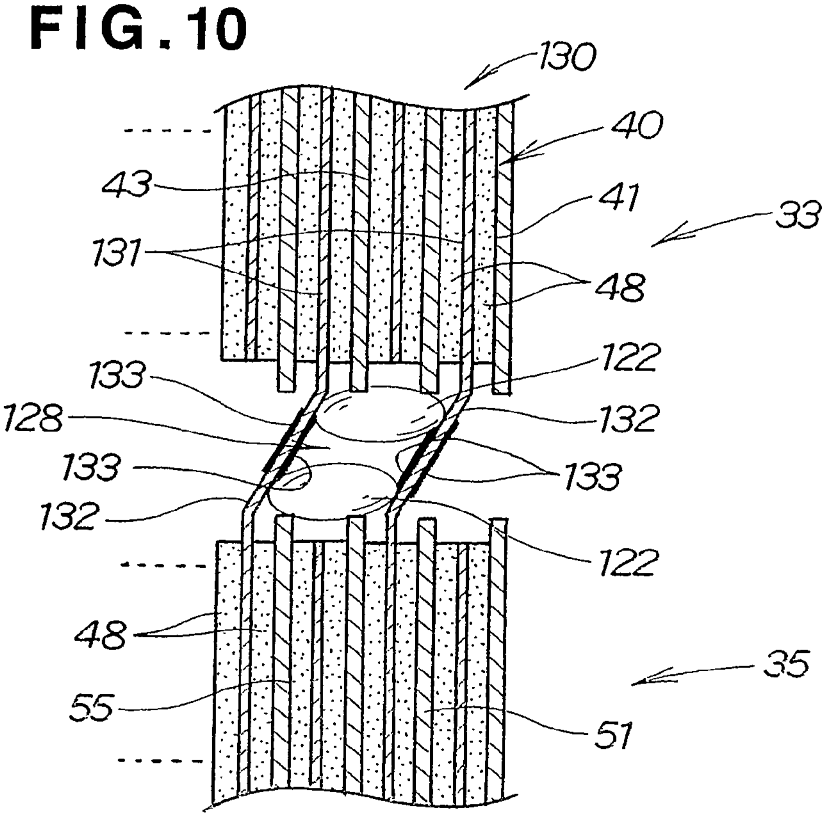
FIG. 10 is a view showing a second variation of the first extended collector foil of the first embodiment, and shows an example wherein a water-repellent substance has been applied to the sides of the middle region of the first extended collector foil.

FIG. 10 shows a second variation of the first extended collector foil of the invention.

The first extended collector foil (extended collector foil) 131 of a series accumulator cell connection structure 130 constituting this second variation differs from the first extended collector foil 46 shown in FIG. 8B only in the point that no round holes 68 of the kind shown in FIG. 2 are provided in its central region 132 and a water-repellent substance 133 such as Teflon™ (DuPont of America's polytetrafluoroethylene) is provided on both sides of the central region 132, and otherwise its construction is the same as the first extended collector foil 46.

As a result of a water-repellent substance 133 being provided on both sides of the central region 132 like this, even when the electrolyte 122 poured into the inside of the top accumulator cell 33 and the middle accumulator cell 35 collects in the space 128 between first extended collector foils 131, 131 (that is, central regions 132, 132), it is repelled by the water-repellent substance 133. Consequently, the continuity of electrolyte 122 staying between the top accumulator cell 33 and the middle accumulator cell 35 is broken and it does not form a liquid junction between the negative electrode body 43 of the top accumulator cell 33 and the positive electrode body 55 of the middle accumulator cell 35. Consequently, the same effects can be obtained as when first round holes 68 are formed in the middle region 46*c* of the first extended collector foil 46 shown in FIG. 5B.

Here, the size of the water-repellent substance 133 provided on the central region 132 is set to a size such that electrolyte 122 staying between the top accumulator cell 33 and the riddle accumulator cell 35 does become continuous.

As the method of providing the water-repellent substance 133 to the central region 132, for example it is applied/bonded thereto before the polarizing electrodes 48 (see also FIG. 4) are put on the positive electrode region and the negative electrode region of the first extended collector foil 131, or it is applied/bonded at the same time as the polarizing electrodes 48 are put on the positive electrode region and the negative electrode region of the first extended collector foil 131.

Although in this second variation an example has been described wherein polytetrafluoroethylene is used as the water-repellent substance 133, some other water-repellent substance 133 may alternatively be used.

Also, in the second variation, the same effects are obtained by providing the water-repellent substance 133 such as polytetrafluoroethylene on the central region of the second extended collector foil (not shown) in the same way as to the central region 132 of the first extended collector foil 131.

Figure 11:
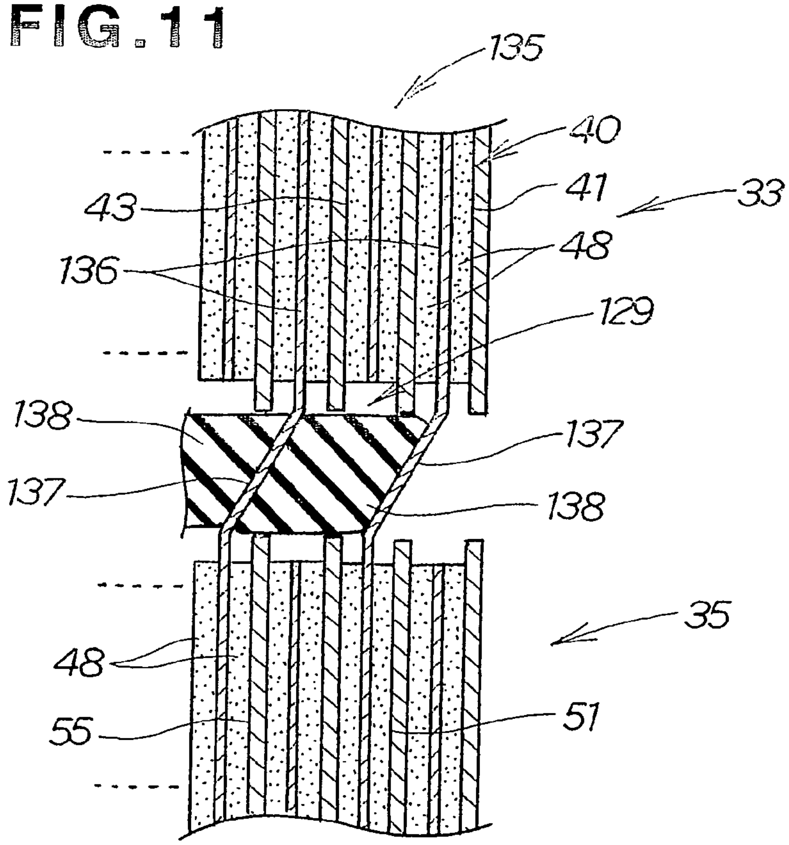
FIG. 11 is a view showing a third variation of the first extended collector foil of the first embodiment, and shows an example wherein a space formed by middle regions of first extended collector foils is filled with an insulating material.

FIG. 11 shows a series accumulator cell connection structure 135 of a third variation.

The first extended collector foil (extended collector foil) 136 of this series accumulator cell connection structure 135 of a third variation differs from the first extended collector foil 46 shown in FIG. 8B only in the point that no multiple round holes 68 of the kind shown in FIG. 2 are provided in its central region 137 and the space 129 between central regions 137 is filled with an insulating material 138, and otherwise its construction is the same as the first extended collector foil 46.

As a result of the space 129 between central regions 137 being filled with an insulating material 138 like this, even when electrolyte 122 poured into the inside of the top accumulator cell 33 and the middle accumulator cell 35 collects in the space 129 between first extended collector foils 136, 136 (that is, central regions 137, 137), the continuity of the electrolyte can be broken with the insulating material 138. Thus, the electrolyte is prevented from forming a liquid junction between the negative electrode body 43 of the top accumulator cell 33 and the positive electrode body 55 of the middle accumulator cell 35. By this means the same effects are obtained as when the multiple first round holes 68 are formed in the middle region 46*c* of the first extended collector foil 46 as in FIG. 8B.

Here, by filling the space between the central regions of second extended collector foils (not shown) in the same way as the spaces between the central regions 137 of the first extended collector foils 136, the same effects are obtained.

When the spaces between the central regions 137 are filled with an insulating material 138 as in the third variation, it is conceivable that the insulating material 138 will block the entry of electrolyte. Therefore, it is desirable that the third variation be applied in a case where two accumulator cells are connected in series. This is because when two accumulator cells are connected in series, electrolyte can be poured through the outer end part of each accumulator cell.

Next, an example of correcting the voltages of the top accumulator cell 33, the middle accumulator cell 35 and the bottom accumulator cell 37 will be described, on the basis of FIG. 12A through FIG. 12C, FIG. 13 and FIG. 14.

Figure 12A:
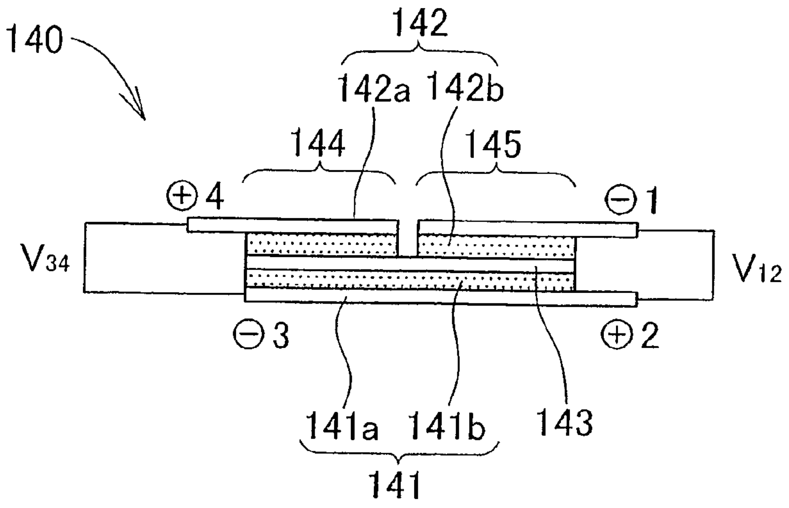
FIG. 12A, FIG. 12B and FIG. 12C are views illustrating correction of the voltages of top, middle and bottom accumulator cells in a first comparison example using a first test accumulator cell, a second comparison example using a second test accumulator cell, and an embodiment of the invention using a third test accumulator cell.
Figure 12B:
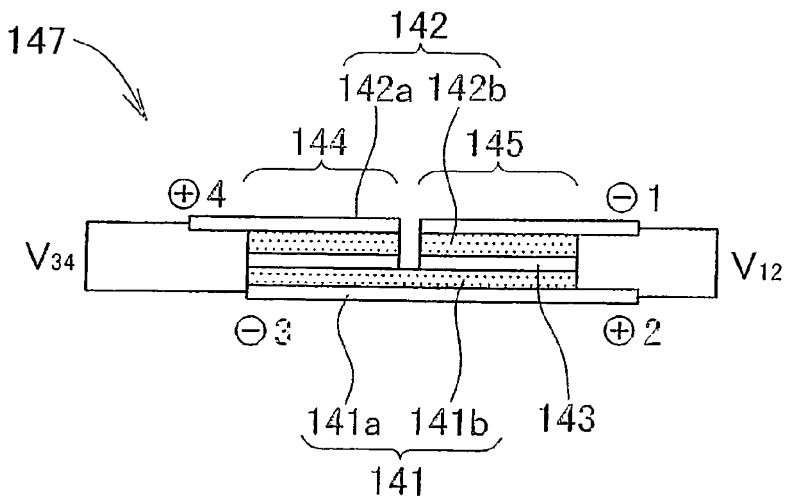
Figure 12C:
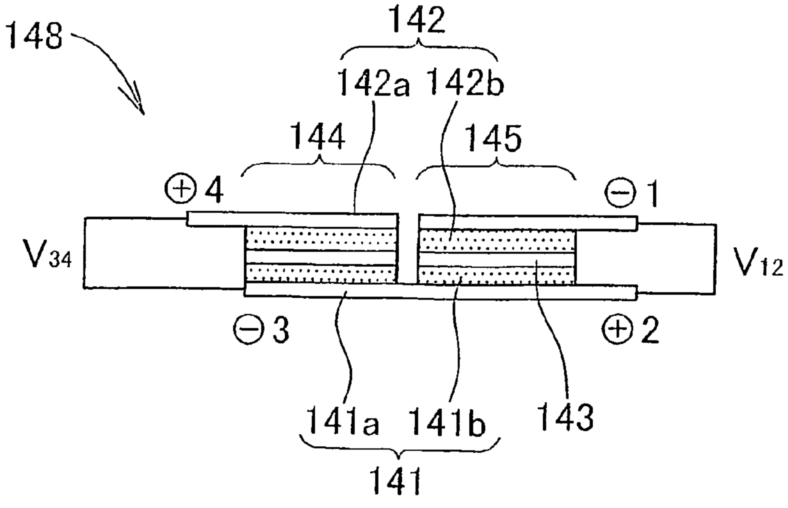

FIG. 12A, FIG. 12B and FIG. 12C show test accumulator cells of first and second comparison examples and the present embodiment.

A first test accumulator cell 140 of Comparison Example 1 shown in FIG. 12A is a structure made by interposing a separator 143 between a lower electrode 141 (that is, a collector foil 141*a* and a polarizing electrode 141*b*) and an upper electrode 142 (that is, a collector foil 142*a* and a polarizing electrode 142*b*) and cutting away just the upper electrode 142.

That is, in the first test accumulator cell 140, a lower electrode 141 and a separator 143 are made continuous with first and second accumulator cells 144, 145 to connect the first and second accumulator cells 144, 145 in series.

A second test accumulator cell 147 of Comparison Example 2 shown in FIG. 12B is a structure made by interposing a separator 143 between a lower electrode 141 and an upper electrode 142 and cutting away the separator 143 as well as the upper electrode 142.

That is, in the second test accumulator cell 147, a lower electrode 141 is made continuous with first and second accumulator cells 144, 145 to connect the first and second accumulator cells 144, 145 in series.

A third test accumulator cell 148 according to the present embodiment shown in FIG. 12C is a structure made by interposing a separator 143 between a lower electrode 141 and an upper electrode 142 and cutting away the polarizing electrode 141*b* of the lower electrode 141 as well as the upper electrode 142 and the separator 143.

That is, in the third test accumulator cell 148, the collector foil 141*a* of the lower electrode 141 is made continuous with the first and second accumulator cells 144, 145 to connect the first and second accumulator cells 144, 145 in series.

This third test accumulator cell 148 is assembled in the same form as the series accumulator cell connection structure 30 shown in FIG. 1.

The first through third test accumulator cells 140, 147, 148 described above are made by performing vacuum degassing with the upper and low electrodes 142, 141 and the separator 143 pre-soaked in electrolyte and then wiping excess electrolyte off the upper and low electrodes 142, 141 and the separator 143 and assembling the upper and low electrodes 142, 141 and the separator 143 after this electrolyte is wiped off.

Using first through third test accumulator cells 140, 147, 143 prepared like this, a charge/discharge test was carried out.

In the charge/discharge test, terminal 1 and terminal 4 of the first through third test accumulator cells 140, 147, 148 were connected to a charge/discharge test instrument, a predetermined charge/discharge current such as for example 25 mA was passed, the voltage $V_{12}$ across terminal 1 and terminal 2 was measured, the voltage $V_{34}$ across terminal 3 and terminal 4 was measured, and a voltage difference between accumulator cells was obtained from the measured voltages $V_{34}$ and $V_{12}$ according to the following formula:

$$V=V_{34}-V_{12}$$

Figure 13:
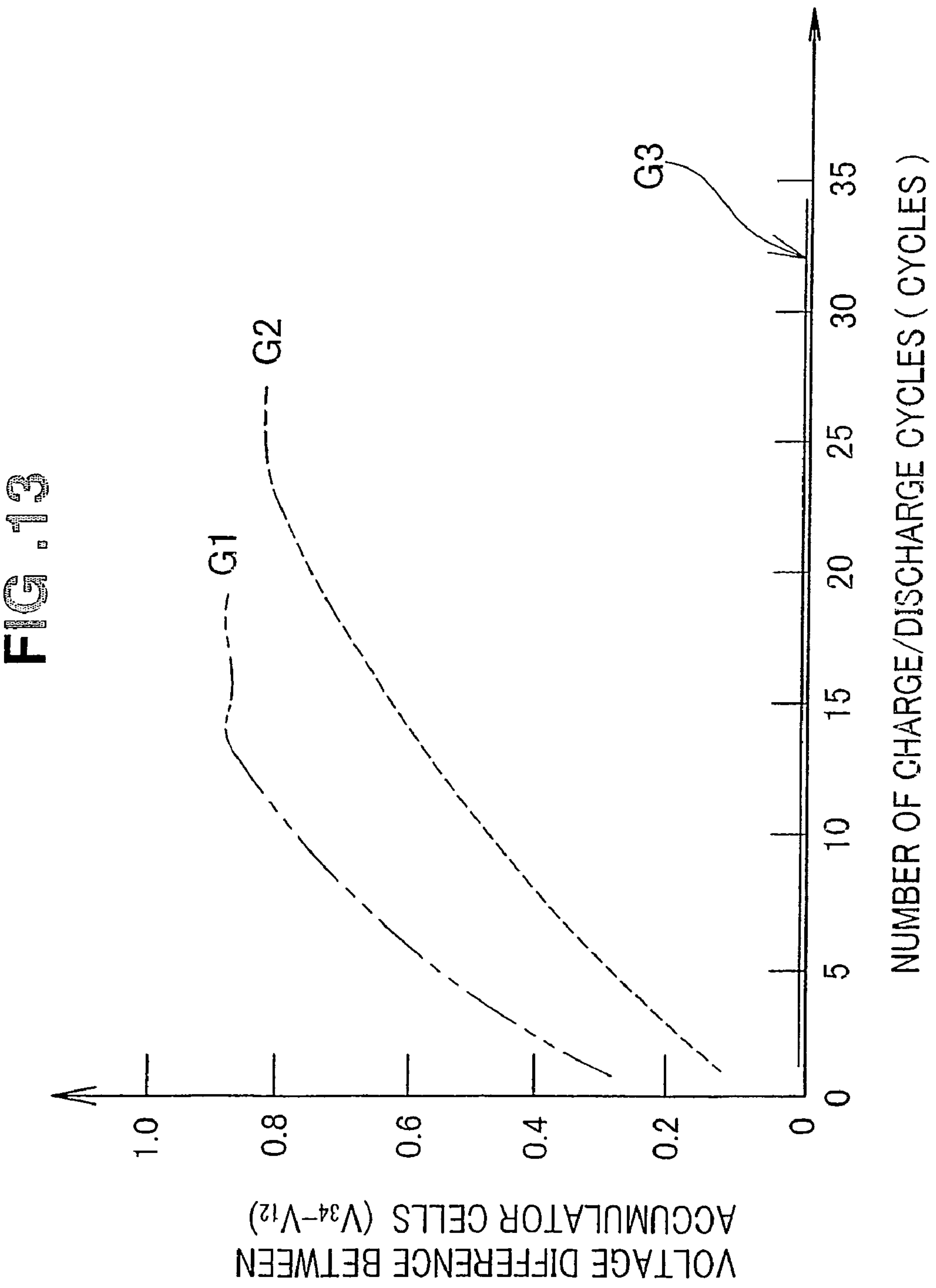
FIG. 13 is a graph showing the relationship between voltage difference between accumulator cells V and charge/discharge cycles for the first, second and third test accumulator cells shown in FIG. 12A, FIG. 12B and FIG. 12C.

The voltage differences V between the accumulator cells obtained in this way for the first through third test accumulator cells 140, 147, 148 are shown in FIG. 13.

FIG. 13 is a graph showing the relationship between the voltage difference V between the accumulator cells of the first through third test accumulator cells and charge/discharge cycles. The horizontal axis shows the charge/discharge cycles (times) and the vertical axis shows the voltage difference between the accumulator cells (V). The curve G1 shown with a double-dashed line shows Comparison Example 1 (the first test accumulator cell 140), the curve G2 shown with a dashed line shows Comparison Example 2 (the second test accumulator cell 147), and the curve G3 shown with a solid line shows the embodiment (the third test accumulator cell 148).

In the case of Comparison Example 1, as shown by the curve G1, the voltage difference between the accumulator cells (V) is relatively high at the time of the start of the charge/discharge cycling, and as the number of charge/discharge cycles increases the voltage difference between the accumulator cells (V) rises steeply also. Consequently, the voltage difference between the accumulator cell 144 and the accumulator cell 145 shown in FIG. 12A becomes large, and thus the form of Comparison Example 1 is not desirable for use in the series accumulator cell connection structure 30 (see FIG. 1).

In the case of Comparison Example 2, as shown by the curve G2, the voltage difference between the accumulator cells (V) is lower than in the case of Comparison Example 1 at the time of the start of the charge/discharge cycling, but as the number of charge/discharge cycles increases the voltage difference between the accumulator cells (V) rises steeply. Consequently, the voltage difference between the accumulator cell 144 and the accumulator cell 145 shown in FIG. 12B becomes large, and thus the form of Comparison Example 2 is not desirable for use in the series accumulator cell connection structure 30 (see FIG. 1).

In the case of the embodiment, as shown by the curve G3, the voltage difference between the accumulator cells (V) is approximately 0 at the time of the start of the charge/discharge cycling, and also the voltage difference between the accumulator cells (V) can be kept to approximately 0 even as the number of charge/discharge cycles increases. Accordingly, the voltage difference between the accumulator cell 144 and the accumulator cell 145 shown in FIG. 12C can be kept small, and the form of the embodiment is desirable for use in the series accumulator cell connection structure 30 (see FIG. 1).

The cause of the voltage difference between the accumulator cells (V) rising as the number of charge/discharge cycles increases is thought to be liquid junctions.

As discussed above, it can be seen from the curves G1 through G3 that the form which keeps the voltage difference between the accumulator cells (V) small is the form wherein the upper electrode 142, the separator 143 and the polarizing electrode 141*b* of the lower electrode 141 are cut away; that is, it is preferable that only the collector foil 141*a* of the lower electrode 141 remain.

Accordingly, in the series accumulator cell connection structure 30, as shown in FIG. 1 and FIG. 2, polarizing electrodes 48 are provided on both sides of the positive electrode region 46*a* and the negative electrode region 46*b* of the first extended collector foil 46, but polarizing electrodes 48 are not provided on either side of the middle region 46*c*.

Similarly, polarizing electrodes 48 are provided on both sides of the positive electrode region 58*a* and the negative electrode region 58*b* of the second extended collector foil 58, but polarizing electrodes 48 are not provided on either side of the middle region 58*c*.

As a result, the voltages of the top accumulator cell 33, the middle accumulator cell 35 and the bottom accumulator cell 37 of the series accumulator cell connection structure 30 can be kept substantially uniform.

Figure 14:
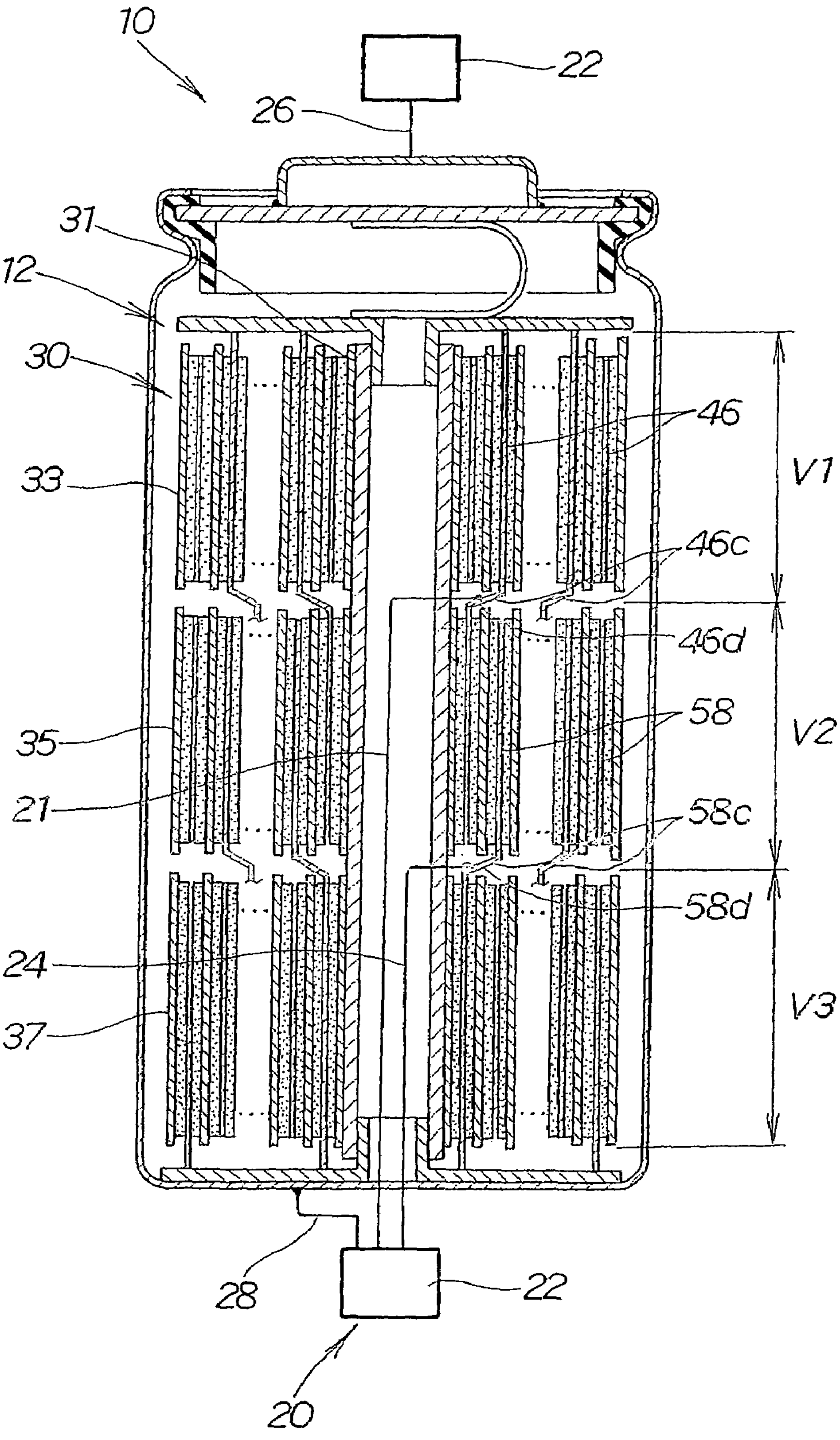
FIG. 14 is a view showing an example of performing correction with voltage correcting means to equalize the voltages of top, middle and bottom accumulator cells in the series accumulator cell connection structure of the first embodiment.

FIG. 14 shows an example of correcting the voltages of the top accumulator cell 33, the middle accumulator cell 35 and the bottom accumulator cell 37 to equalize them with the voltage correcting means 20.

In the voltage correcting means 20, a part 46*d* on the hollow core 31 side of the middle region 46*c* of the first extended collector foil 46 is connected by a first lead wire 21 to a control part 22; a part 58*d* on the hollow core 31 side of the middle region 58*c* of the second extended collector foil 58 is connected to the control part 22 by a second lead wire 24; the cover part 16, serving as a positive electrode, is connected to the control part 22 by a third lead wire 26; and the bottom part 14 of the cylindrical container 11, serving as a negative electrode, is connected to the control part 22 by a fourth lead wire 28.

By this means, the respective voltages V1, V2 and V3 of the top accumulator cell 33, the middle accumulator cell 35 and the bottom accumulator cell 37 can be measured with the control part 22.

Here, it may happen that the result of measuring the voltages V1, V2 and V3 of the top accumulator cell 33, the middle accumulator cell 35 and the bottom accumulator cell 37 is that the voltages V1, V2 and V3 are not equal.

In this case, by supplying current to or discharging individually the top accumulator cell 33, the middle accumulator cell 35 and the bottom accumulator cell 37 via the first through fourth lead wires 21, 24, 26 and 28, it is possible to correct the voltages of the accumulator cells 33, 35 and 37 individually.

For example, when the voltage V2 of the middle accumulator cell 35 is higher than the voltages V1, V3 of the upper and lower accumulator cells 33 and 37, by control being performed with the control part 29 so as to discharge current through the first and second lead wires 21 and 24, the voltage V2 of the middle accumulator cell 35 can be lowered and equalized with the voltages V1, V3 of the upper and lower accumulator cells 33, 37.

On the other hand, when the voltage V2 of the middle accumulator cell 35 is lower than the voltages V1, V3 of the upper and lower accumulator cells 33 and 37, by control being carried out with the control part 22 so as to supply current through the first and second lead wires 21 and 24, the voltage V2 of the middle accumulator cell 35 can be raised to make it equal with the voltages V1, V3 of the upper and lower accumulator cells 33 and 37.

Next, batteries according to second through eighth embodiments will be described, on the basis of FIG. 15 through FIG. 22. In these second through eighth embodiments, parts the same as in the first embodiment have been given the same reference numerals and will not be described again.

Figure 15:
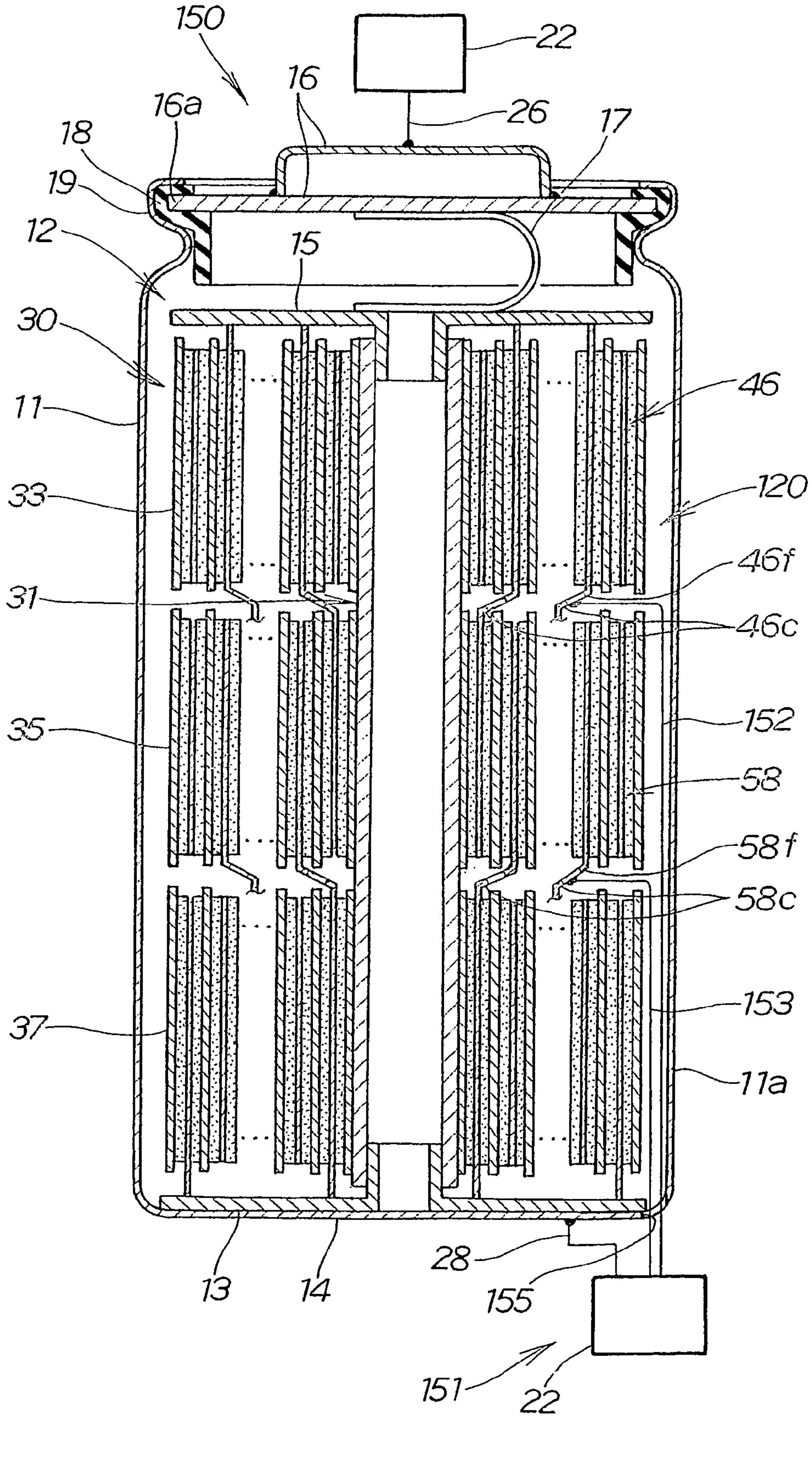
FIG. 15 is a sectional view of a cylindrical battery having a series accumulator cell connection structure of a second embodiment of the invention.

FIG. 15 shows a cylindrical battery having a series accumulator cell connection structure according to a second embodiment.

The cylindrical battery 150 of this second embodiment differs from the first embodiment only in that its voltage correcting means 151 is different from the voltage connecting means 20 (see FIG. 1), and otherwise its construction is the same.

Referring to FIG. 15, the voltage correcting means 151 of this second embodiment has a structure made by connecting a first lead wire (lead wire) 152 to an outer part 46*f* of the middle region 46*c* of the first extended collector foil 46 and connecting the first lead wire 152 to the control part 22; connecting a second lead wire (lead wire) 153 to an outer part 58*f* of the middle region 58*c* of the second extended collector foil 58 and connecting the second lead wire 153 to the control part 22; connecting the cover part 16, serving as a positive electrode, to the control part 22 by a third lead wire 26; and connecting the bottom part 14 of the cylindrical container 11, serving as a negative electrode, to the control part 22 by a fourth lead wire 28.

The first lead wire 152 is routed through the gap 120 between the cylindrical container 11 and the series accumulator cell connection structure 30 to the bottom part 14 of the cylindrical container 11 and extends through a through hole 155 in the bottom part 14 to outside the cylindrical battery 10 and is connected to the control part 22.

The second lead wire 153, like the first lead wire 152, is routed through the gap 190 between the cylindrical container 11 and the series accumulator cell connection structure 30 to the bottom part 14 of the cylindrical container 11 and extends through the through hole 155 in the bottom part 14 to outside the cylindrical battery 10 and is connected to the control part 22.

As a result of the first and second lead wires 152, 153 being routed using the gap 120 between the cylindrical container 11 and the series accumulator cell connection structure 30 like this, it is not necessary to newly provide a space for the first and second lead wires 152, 153 to pass through. Consequently, the first and second lead wires 152, 153 can be installed quickly and easily.

As a result of the first and second lead wires 152, 153 being routed using the gap 120 between the cylindrical container 11 and the series accumulator cell connection structure 30, it is not necessary to make through holes for the first and second lead wires 152, 153 to pass through in the wall 11*a* of the cylindrical container 11 housing the accumulator cells 33, 35 and 37.

With this voltage correcting means 151, as with the voltage correcting means 20, by supplying current to or discharging the top accumulator cell 33, the middle accumulator cell 35 and the bottom accumulator cell 37 individually through the first through fourth lead wires 152, 153, 26 and 28, it is possible to correct individually the voltages of the accumulator cells 33, 35 and 37.

Figure 16:
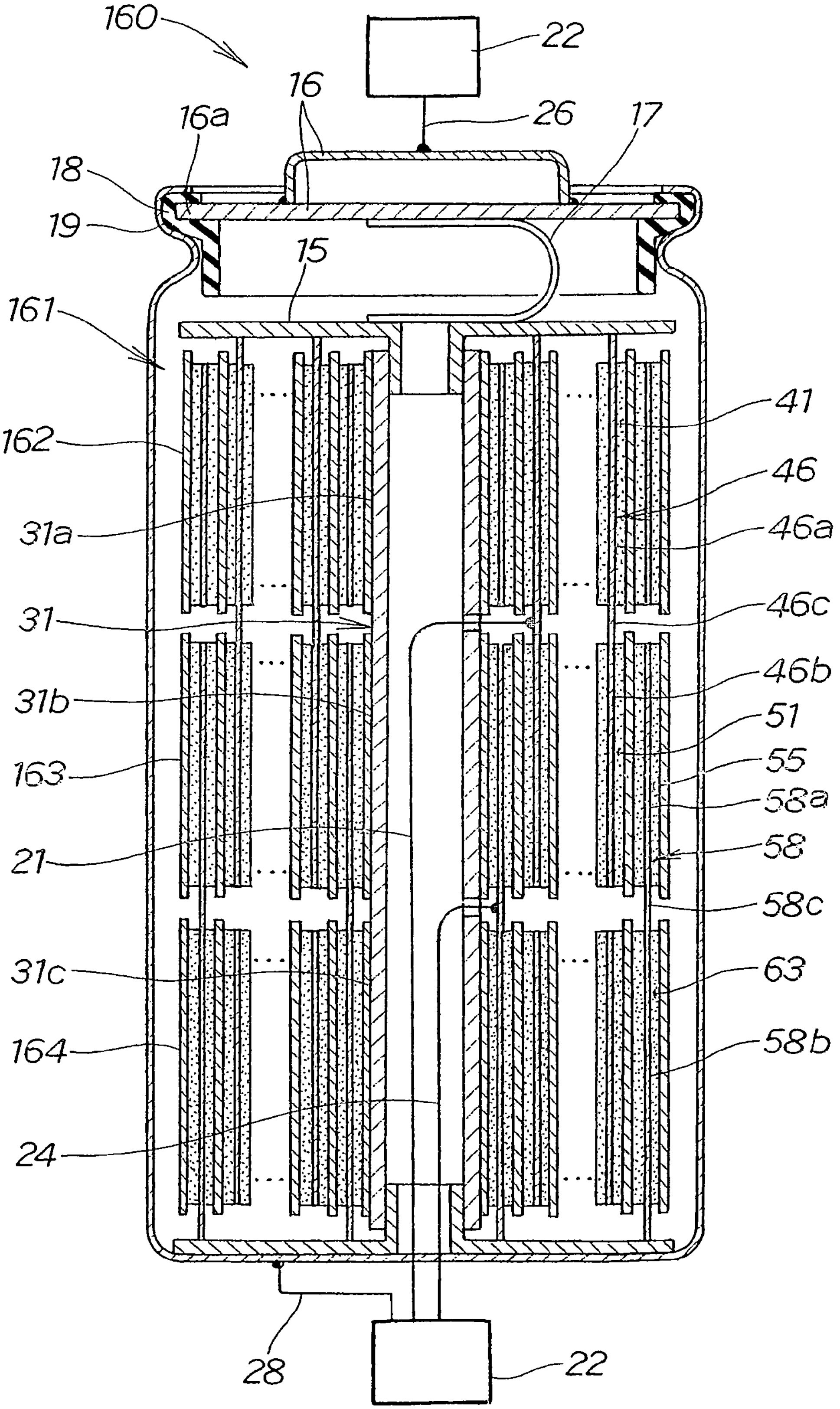
FIG. 16 is a sectional view of a cylindrical battery having a series accumulator cell connection structure of a third embodiment of the invention.

FIG. 16 shows a cylindrical battery having a series accumulator cell connection structure according to a third embodiment.

In the cylindrical battery 160 of this third embodiment only its series accumulator cell connection structure 161 differs from the series accumulator cell connection structure 30 (see FIG. 1) of the first embodiment, and the rest of the construction is the same as the first embodiment.

Referring to FIG. 16, the series accumulator cell connection structure 161 is a construction made by winding a top accumulator cell 162 onto the top part 31*a* of the hollow core 31, wincing a middle accumulator cell 163 onto the middle part 31*b* of the hollow core 31 and winding a bottom accumulator cell 164 onto the bottom part 31*c* of the hollow core 31, and connecting the three accumulator cells, the top accumulator cell 162, the middle accumulator cell 163 and the bottom accumulator cell 164, in series.

In this series accumulator cell connection structure 161, the top accumulator cell 162 and the middle accumulator cell 163 are connected in series by a single first extended collector foil 46 being used commonly for both the collector foil of the positive electrode body 41 of the top accumulator cell 162 and the collector foil of the negative electrode body 51 of the middle accumulator cell 163. Also, the middle accumulator cell 163 and the bottom accumulator cell 164 are connected in series by a single second extended collector foil 58 being used commonly for both the collector foil of the positive electrode body 55 of the middle accumulator cell 163 and the collector foil of the negative electrode body 63 of the bottom accumulator cell 164.

The middle region 46*c* of the first extended collector foil 46 extends parallel with the hollow core 31 from the positive electrode region 46*a* to the negative electrode region 46*b*.

The middle region 58*c* of the second extended collector foil 58 extends parallel with the hollow core 31 from the positive electrode region 58*a* to the negative electrode region 58*b*.

That is, the series accumulator cell connection structure 161 of the third embodiment differs from the series accumulator cell connection structure 30 of the first embodiment only in that the middle regions 46*c*, 58*c* each extend parallel with the hollow core 31, and the rest of the construction is the same as the first embodiment.

As will be explained below with reference to FIG. 17, with respect to the manufacture of the series accumulator cell connection structure 30 shown in FIG. 1, the series accumulator cell connection structure 161 of the third embodiment described above can be manufactured easily but differs in structure from the first embodiment in the point that the first wind and the last wind to the hollow core 31 of the top accumulator cell 162 and the bottom accumulator cell 164 are negative electrodes but in the case of the middle accumulator cell 163 they are positive electrodes.

Next, a method for manufacturing a series accumulator cell connection structure 161 according to the third embodiment will be described, on the basis of FIG. 17.

Figure 17:
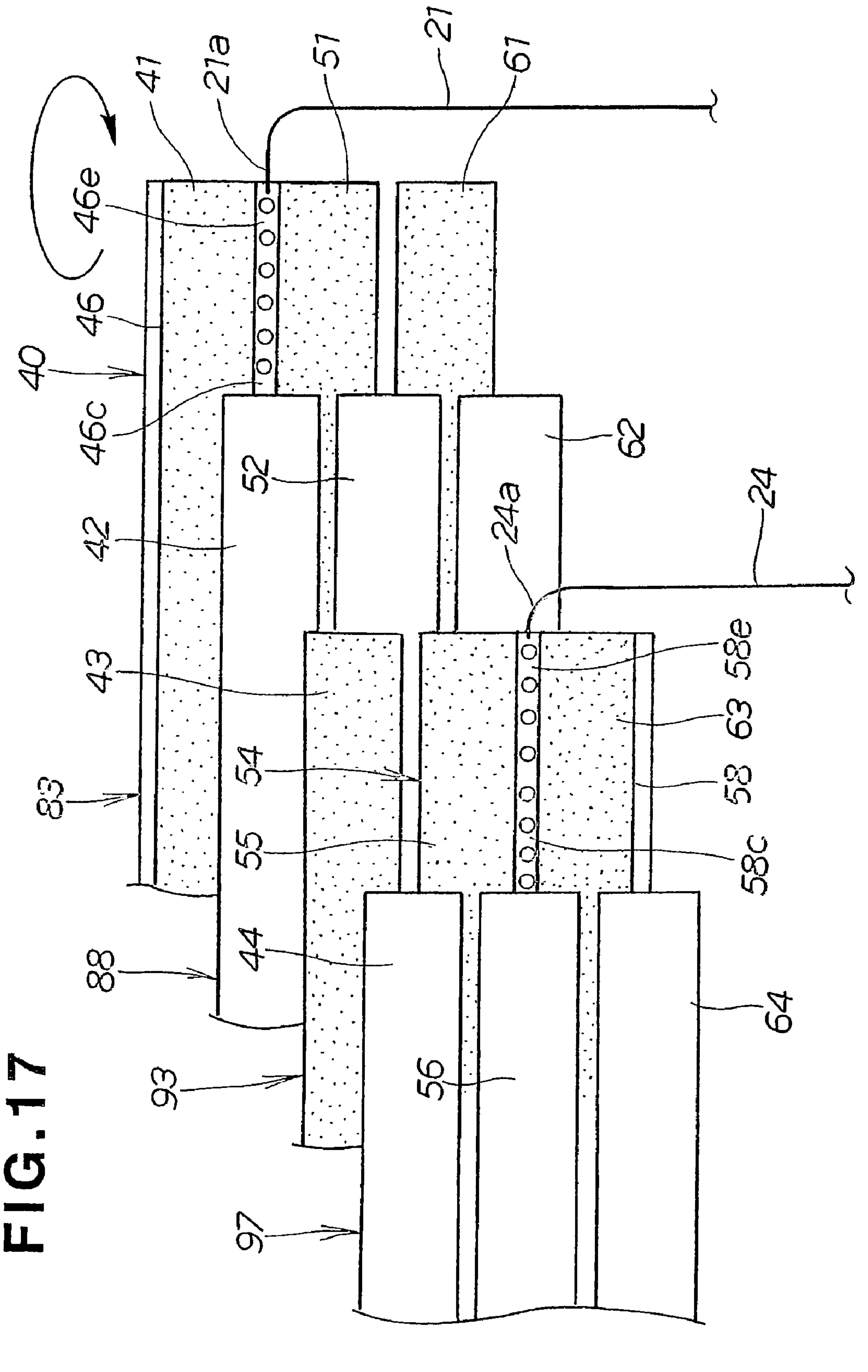
FIG. 17 is a view showing electrode bodies and separators of the series accumulator cell connection structure of the third embodiment shown in FIG. 16 before they are wound on a winding core.

FIG. 17 shows the electrode bodies and separators of a series accumulator cell connection structure according to the third embodiment before winding.

A positive electrode body 41 of a first extended electrode body 40 of a first electrode sheet 83, a first top separator 42 of a first separator 88, a negative electrode body 43 of a second electrode sheet 93 and a second top separator 44 of a second separator 97 are layered together.

A negative electrode body 51 of a first extended electrode body 40, a first middle separator 52 of the first separator 88, a positive electrode body 55 of a second extended electrode body 54 of a second electrode sheet 93, and a second middle separator 56 of the second separator 97 are layered together.

A positive electrode body 61 of the first electrode sheet 83, a first middle separator 52 of the first separator 88, a negative electrode body 63 of the second extended electrode body 54, and a second bottom separator 64 of the second separator 97 are layered together.

A first end 21*a* of the first lead wire 21 is connected to the leading end 46*e* of the middle region 46*c* of the first extended collector foil 46 of the first extended electrode body 40.

A first end 24*a* of the second lead wire 24 is connected to the leading end 58*e* of the middle region 58*c* of the second extended collector foil 58 of the second extended electrode body 54.

By the first and second electrode sheets 83, 93 and the first and second separator sheets 88, 97 being layered together and rolled in the direction of the arrow in this state, the series accumulator cell connection structure 161 shown in FIG. 16 is obtained.

With the series accumulator cell connection structure 161 of this third embodiment, because the middle regions 46*c*, 58*c* are configured to extend parallel with the hollow core 31, it is not necessary to remove one wind 61*a* (the hatched region) of the positive electrode body 61 of the first electrode sheet 83, to remove one wind 69*a* (the hatched region) of the first bottom separator 62 of the first separator 88, to remove one wind 54*a* (the hatched region) of the second extended electrode body 54 of the second electrode sheet 93, to remove one wind 56*a* (the hatched region) of the second middle separator 56 of the second separator 97, or to remove one wind 64*a* (the hatched region) of the second bottom separator 64, as described with reference to FIG. 4 of the first embodiment.

Therefore, the operation of winding the series accumulator cell connection structure 161 can be carried out quickly and easily.

Figure 18:
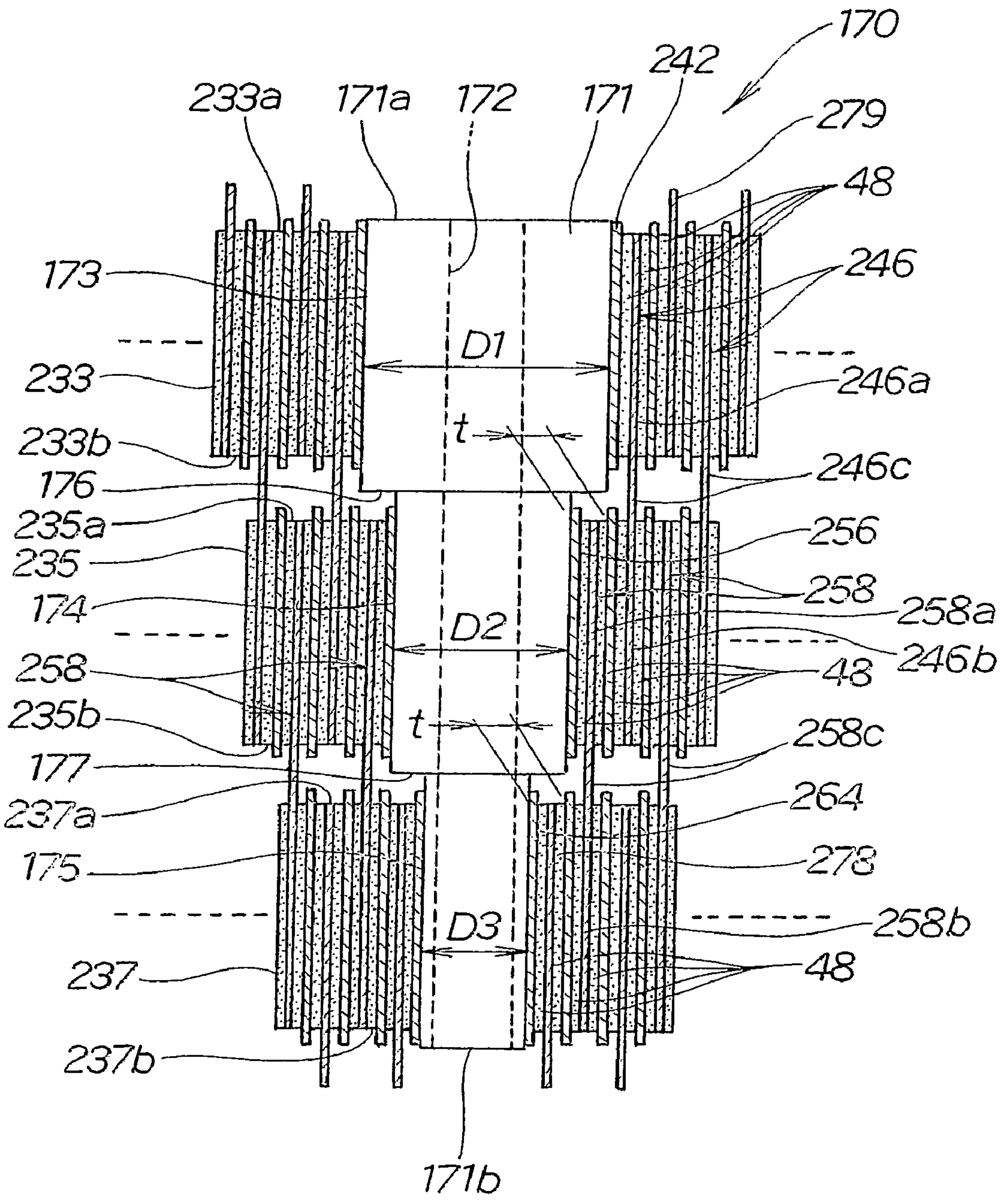
FIG. 18 is a view showing a series accumulator cell connection structure of a fourth embodiment, and shows an example wherein the diameter of a top part of a core, on which a top accumulator cell is wound, the diameter of a middle part of the core, on which a middle accumulator cell is wound, and the diameter of a bottom part of the core, on which a bottom accumulator cell is wound, are made different.

FIG. 18 shows a series accumulator cell connection structure according to a fourth embodiment. The series accumulator cell connection structure 170 of this fourth embodiment differs only in that its hollow core 171 is different from the hollow core 31 of the first embodiment (see FIG. 1), and the rest of its construction is the same as the first embodiment.

A first extended collector foil 246 of the fourth embodiment is a part equivalent to the first extended collector foil 46 in the first embodiment, and a second extended collector foil 258 is a part equivalent to the second extended collector foil 58 of the first embodiment.

The first extended collector foil 246 is made up of a negative electrode region 246*a* of width L1, a positive electrode region 246*b* of width L1, and a middle region 246*c* of width L2. The negative electrode region 246*a* and the positive electrode region 246*b* respectively have width L1, and the middle region 246*c* has a width L2. Thus, the first extended collector foil 246 is set to at least twice (specifically, 2×L1+L2) the width of the polarizing electrodes 48.

The second extended collector foil 258 is made up of a negative electrode region 258*a* of width L1, a positive electrode region 253*b* of width L1, and a middle region 258*c* of width L2. The negative electrode region 258*a* and the positive electrode region 258*b* respectively have width L1, and the middle region 246*c* has a width L2. Thus, the second extended collector foil 258 is set to at least twice (specifically, 2×L1+L2) the width of the polarizing electrodes 48.

The hollow core 171 has a hollow part 172 passing all the way through it from its top end 171*a* to its bottom end 171*b*. A top part 173 of the hollow core 171 is of external diameter D1, a middle part 174 is of external diameter D2, and a bottom part 175 is of external diameter D3, and the external diameters D1, D2 and D3 are in the relationship D1>D2>D3.

A first step 176 formed by the top part 173 and the middle part 174 is (D1−D2)/2. A second step 177 formed by the middle part 174 and the bottom part 175 is (D2−D3)/2.

The first step 176 is set to the same thickness as the thickness t when stacked of a first middle separator 256, the negative electrode region 258*a* of the second extended collector foil 258, and polarizing electrodes 48, 48 provided on the sides of the negative electrode region 258*a*.

The second step 177 is set to the same thickness as the thickness t when stacked of a first bottom separator 264, a negative electrode collector foil 278, and polarizing electrodes 48, 48 provided on the sides of the collector foil 278.

By providing a first step 176 between the top part 173 and the middle part 174 of the hollow core 171 and providing a second step 177 between the middle part 174 and the bottom part 175 like this, it is possible to match the winding orders of the positive and negative electrodes of a top accumulator cell 233, a middle accumulator cell 235 and a bottom accumulator cell 237 without bending the middle region 246*c* of the first extended collector foil 246 and the middle region 258*c* of the second extended collector foil 258 to a diagonal.

The top accumulator cell 293, the middle accumulator cell 235 and the bottom accumulator cell 237 correspond to the top accumulator cell 33, the middle accumulator cell 35 and the bottom accumulator cell 37 of the first embodiment.

The reference number 279 denotes a collector foil for a positive electrode, and a positive electrode body is constructed by polarizing electrodes 48, 48 being provided on both sides of this positive electrode collector foil 279. The reference number 242 denotes a first upper separator.

Because it is not necessary for the middle region 246*c* of the first extended collector foil 246 and the middle region 258*c* of the second extended collector foil 258 to be bent to a diagonal, there is no risk of twisting occurring in the middle regions 246*c*, 258*c*. Because twisting does not occur in the middle regions 246*c*, 258*c*, the first and second extended collector foils 246, 258 can be wound accurately. Therefore, the end faces 233*a* and 233*b* of the top accumulator cell 233, the end faces 235*a* and 235*b* of the middle accumulator cell 235, and the end faces 237*a* and 237*b* of the bottom accumulator cell 237 can be aligned more accurately and for example continuity between electrodes can be prevented with certainty.

As in the first embodiment, because the winding orders of the positive and negative electrodes of the top accumulator cell 233, the middle accumulator cell 235 and the bottom accumulator cell 237 can be matched, the effect is obtained that the top accumulator cell 233, the middle accumulator cell 235 and the bottom accumulator cell 237 do not readily lose electrochemical stability.

In the fourth embodiment, an example was described wherein steps are provided between the external diameter D1 of a top part 173, the external diameter D2 of a middle part 174 and the external diameter D3 of a bottom part 175 of the hollow core 171, to match the winding orders of the positive and negative electrodes of the top accumulator cell 233, the middle accumulator cell 235 and the bottom accumulator cell 237; however, instead of providing steps in the hollow core 171, it is also possible to match the winding orders of the positive and negative electrodes of the top accumulator cell 233, the middle accumulator cell 235 and the bottom accumulator cell 937 by forming steps by adjusting the number of separator winds.

The cylindrical battery 10 shown in FIG. 1 has separators 42, 52 and 62 at the peripheries of the top accumulator cell 33, the middle accumulator cell 35 and the bottom accumulator cell 37 respectively, and also has separators 44, 56 and 64 at their inner peripheries (see also FIG. 4).

Because of this, even if the cylindrical container 11 and the hollow core 31 are made of conducting materials, the accumulator cells 33, 35 and 37 can be prevented from being electrically continuous with the cylindrical container 11 and the hollow core 31 with ordinary separators.

Now, in the top accumulator cell 33, the middle accumulator cell 35 and the bottom accumulator cell 37 used in the cylindrical battery 10, to keep their internal resistances low, there is a trend towards using separators with high conductivity characteristics for the separators 42, 52, 62, 44, 56 and 64.

Because of this, it is conceivable that the top accumulator cell 33, the middle accumulator cell 35 and the bottom accumulator cell 37 could become continuous via the cylindrical container 11 and the hollow core 31.

The following fifth through eighth embodiments provide countermeasures to this. It will be assumed in the description that the cylindrical container 11 is made of aluminum alloy and the hollow core 31 is made of aluminum alloy.

Figure 19:
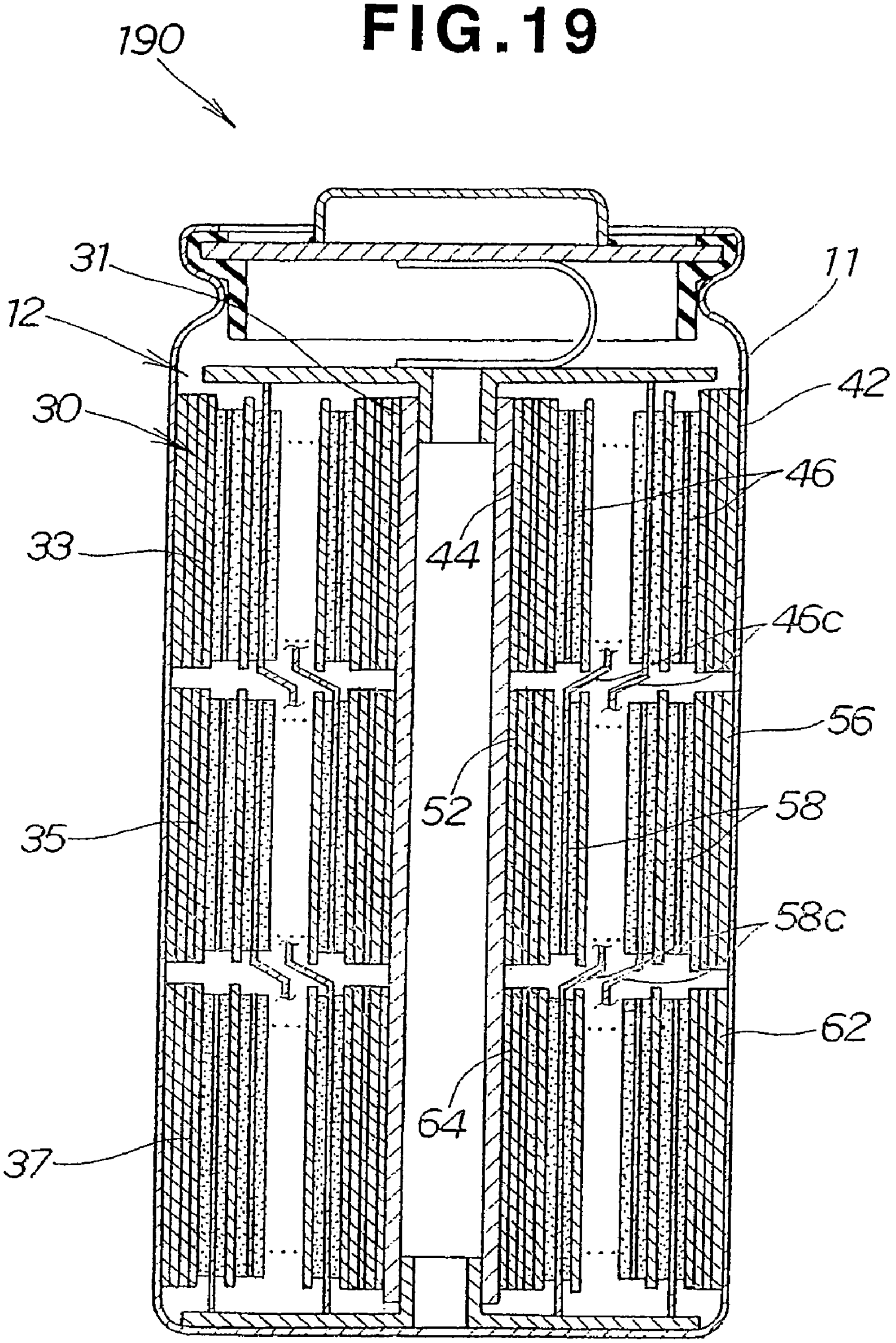
FIG. 19 is a sectional view of a cylindrical battery having a series accumulator cell connection structure of a fifth embodiment of the invention.

FIG. 19 shows a series accumulator cell connection structure according to a fifth embodiment.

A cylindrical battery 190 of this fifth embodiment has a first top separator 42 wound a number of times between the top accumulator cell 33 and the cylindrical container 11, a second top separator 44 wound a number of times between the top accumulator cell 33 and the hollow core 31, a second middle separator 56 wound a number of times between the middle accumulator cell 35 and the cylindrical container 11, a first middle separator 52 wound a number of times between the middle accumulator cell 35 and the hollow core 31, a first bottom separator 62 wound a number of times between the bottom accumulator cell 37 and the cylindrical container 11, and a second bottom separator 64 wound a number of times between the bottom accumulator cell 37 and the hollow core 31. The cylindrical battery 190 differs from the cylindrical battery 10 of the first embodiment in this point only, and the rest of its construction is the same as that of the first embodiment.

By separators being wound multiple times like this, the influence of continuity of the top accumulator cell 33, the middle accumulator cell 35 and the bottom accumulator cell 37 with the cylindrical container 11 and the hollow core 31 is reduced and discharging of the top accumulator cell 33, the middle accumulator cell 35 and the bottom accumulator cell 37 through the cylindrical container 11 and the hollow core 31 is prevented. Thus, the potentials of the top accumulator cell 33, the middle accumulator cell 35 and the bottom accumulator cell 37 can be kept uniform and dropping of the accumulated energy of the cylindrical battery 190 is prevented.

Figure 20:
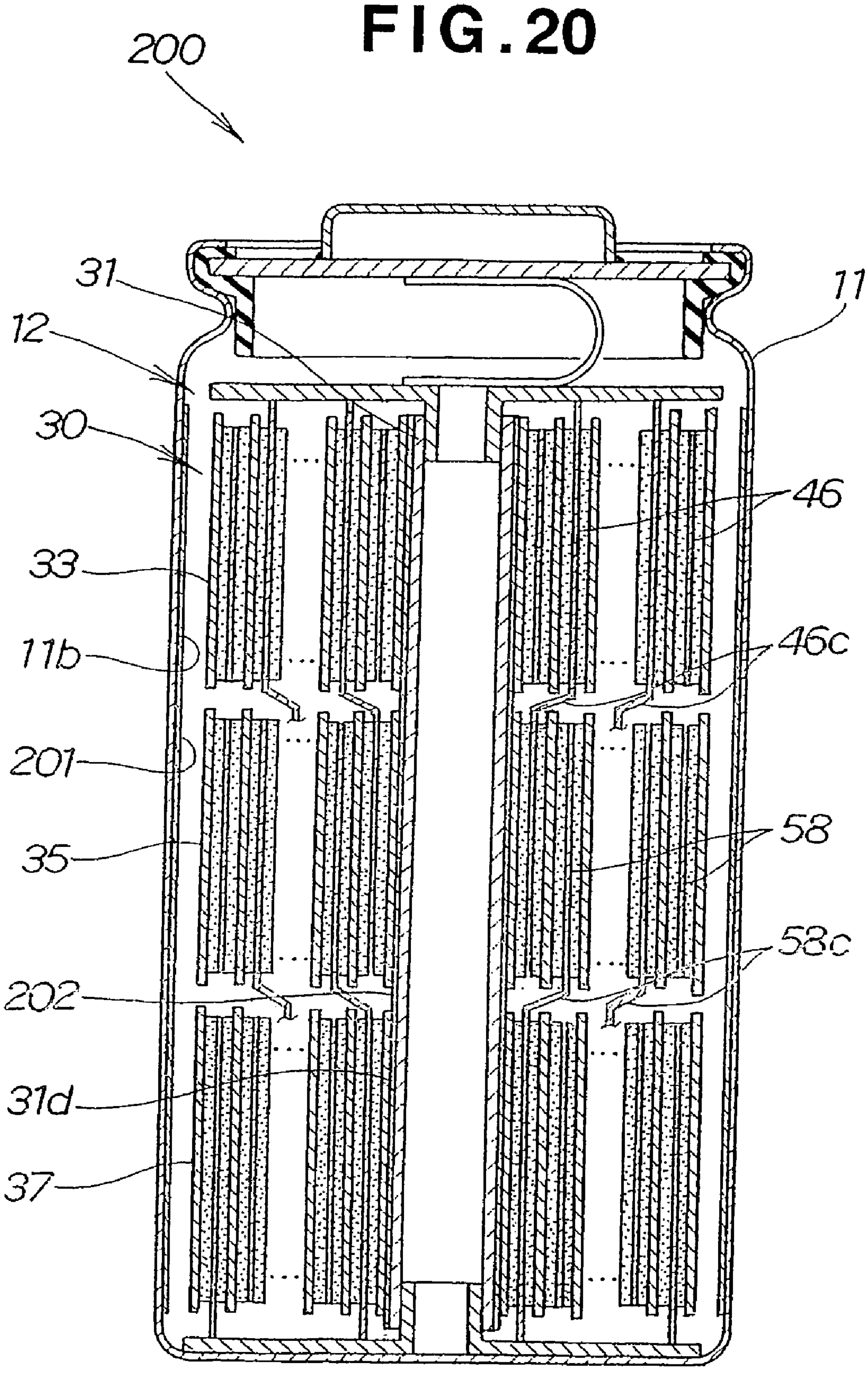
FIG. 20 is a sectional view of a cylindrical battery having a series accumulator cell connection structure of a sixth embodiment of the invention, and is a view showing an example wherein an insulating member is provided on the inner circumferential surface of a cylindrical container.

FIG. 20 shows a series accumulator cell connection structure of a sixth embodiment.

A cylindrical battery 200 of this sixth embodiment differs from the cylindrical battery 10 of the first embodiment only in that a part 201 with low electrical conductivity is provided on the inner circumferential surface 11*b* of the cylindrical container 11 and a part 202 with low electrical conductivity is provided on the outer circumferential surface 31*d* of the hollow core 31, and the rest of its construction is the same as that of the first embodiment.

For the low-conductivity parts 201 and 202, for example paper is suitable.

By this means, as in the fifth embodiment, the influence of continuity of the top accumulator cell 33, the middle accumulator cell 35 and the bottom accumulator cell 37 with the cylindrical container 11 and the hollow core 31 is reduced and discharging of the top accumulator cell 33, the middle accumulator cell 35 and the bottom accumulator cell 37 through the cylindrical container 11 and the hollow core 31 is prevented. Thus, the potentials of the top accumulator cell 33, the middle accumulator cell 35 and the bottom accumulator cell 37 can be kept uniform and dropping of the accumulated energy of the cylindrical battery 200 is prevented.

In the sixth embodiment (the cylindrical battery 200), although they are not shown in the drawings, first and second variations are conceivable.

In a cylindrical battery 200 of a first variation, the same effects as those of the sixth embodiment are obtained by bringing the inner surface 11*b* of the cylindrical container 11 to a non-conducting state and bringing the outer surface 31*d* of the hollow core 31 to a non-conducting state.

As the means for bringing the inner surface 11*b* of the cylindrical container 11 and the outer surface 31*d* of the hollow core 31 to a non-conducting state, for example there is the method of using a surface treatment such as an alumite or insulating coating, and the method of affixing a non-conducting member with an adhesive.

As the insulating coating, for example polycarbonates and the like are suitable, and as a non-conducting member for example Kapton Tape™ (registered trade mark of a polyimide film of DuPont of America) and the like are suitable.

In a cylindrical battery 200 of a second variation of the sixth embodiment, the same effects as those of the sixth embodiment are obtained by disposing insulating members between the cylindrical container 11 and the accumulator cells 33, 35 and 37 and disposing insulating members between the hollow core 31 and the accumulator cells 33, 35 and 37.

As an insulating member to be disposed between the cylindrical container 11 and the accumulator cells 33, 35 and 37, for example polytetrafluoroethylene (PTFE) can be used.

Figure 21:
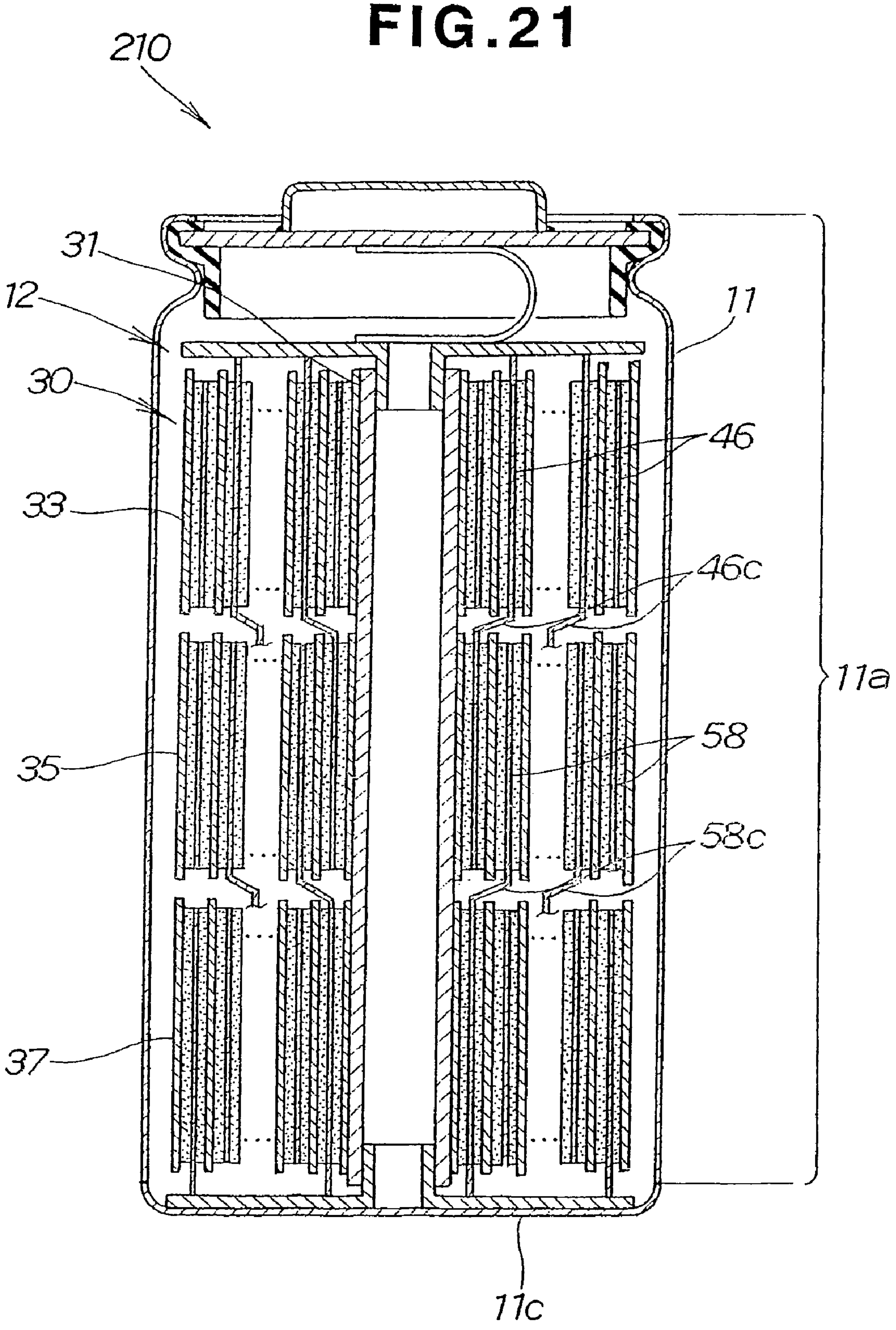
FIG. 21 is a view pertaining to a seventh embodiment of the invention and showing an example wherein the circumferential wall part, which does not include the bottom part, of a cylindrical container of a cylindrical accumulator battery, is made of an insulating material.

FIG. 21 shows a series accumulator cell connection structure of a seventh embodiment.

A cylindrical battery 210 of this seventh embodiment differs from the cylindrical battery 10 of the first embodiment only in that the wall 11*a* of the cylindrical container 11 is made with an insulating material and the hollow core 31 is made with an insulating material, and the rest of the construction is the same as the first embodiment. The bottom part 11*c* of the cylindrical container 11 is made of a conducting material.

As the insulating material forming the wall 11*a* and the hollow core 31, for example polypropylene (PP), polyethylene (PE), polybutylene terephthalate (PBT) or polyphenylene sulfide (PPS) can be used.

By this means, as in the fifth embodiment, the top accumulator cell 33, the middle accumulator cell 35 and the bottom accumulator cell 37 are prevented from being electrically continuous with the cylindrical container 11 and the hollow core 31, and the top accumulator cell 33, the middle accumulator cell 35 and the bottom accumulator cell 37 are prevented from discharging through the cylindrical container 11 and the hollow core 31. Thus, the potentials of the top accumulator cell 33, the middle accumulator cell 35 and the bottom accumulator cell 37 can be kept uniform and dropping of the accumulated energy of the cylindrical battery 210 can be prevented.

Figure 22:
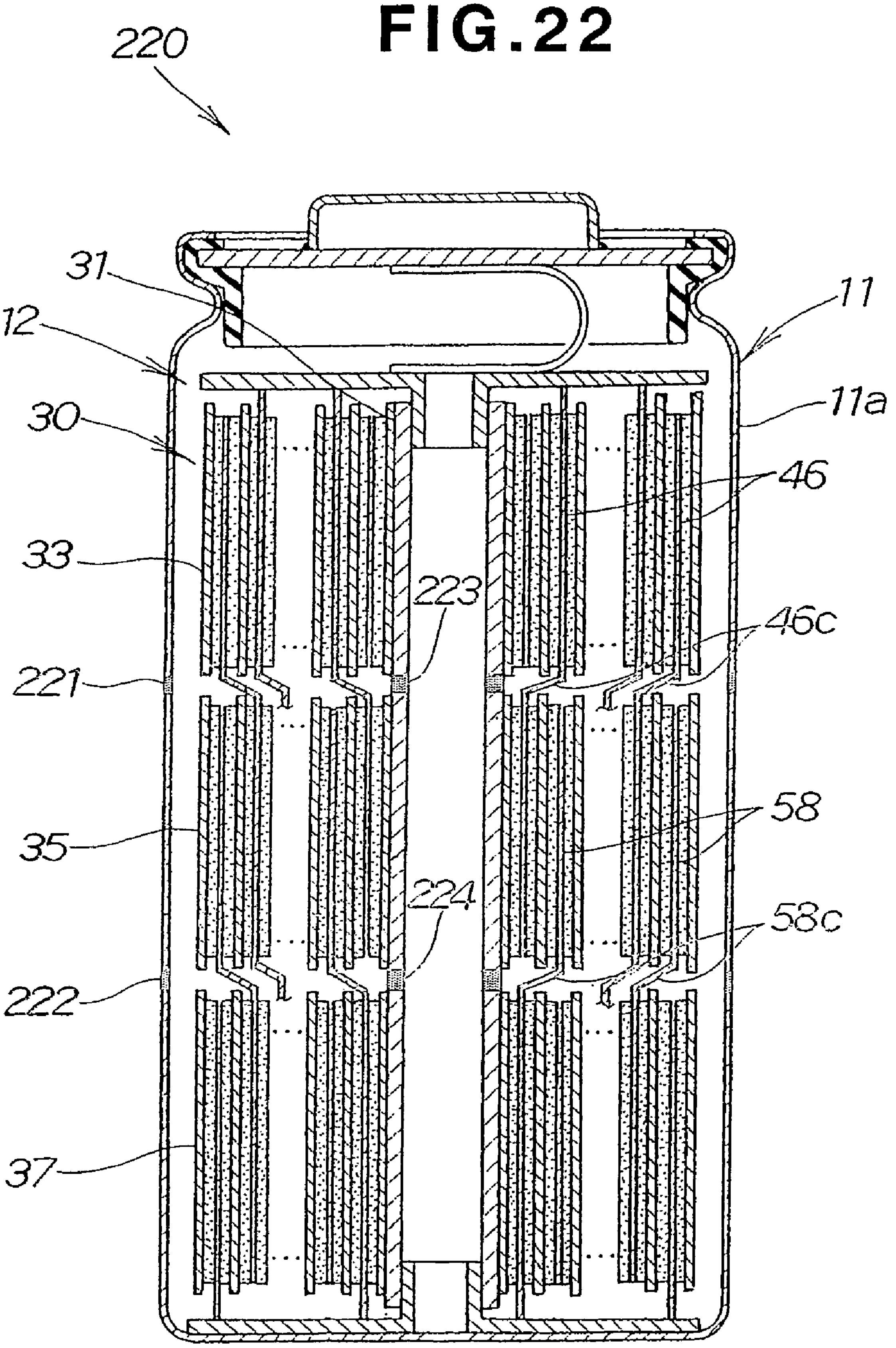
FIG. 22 is a view pertaining to an eighth embodiment of the invention and showing an example wherein insulating members are interposed in parts of the circumferential wall of a cylindrical container and of a core corresponding to parts between adjacent accumulator cells.
Figure 23:
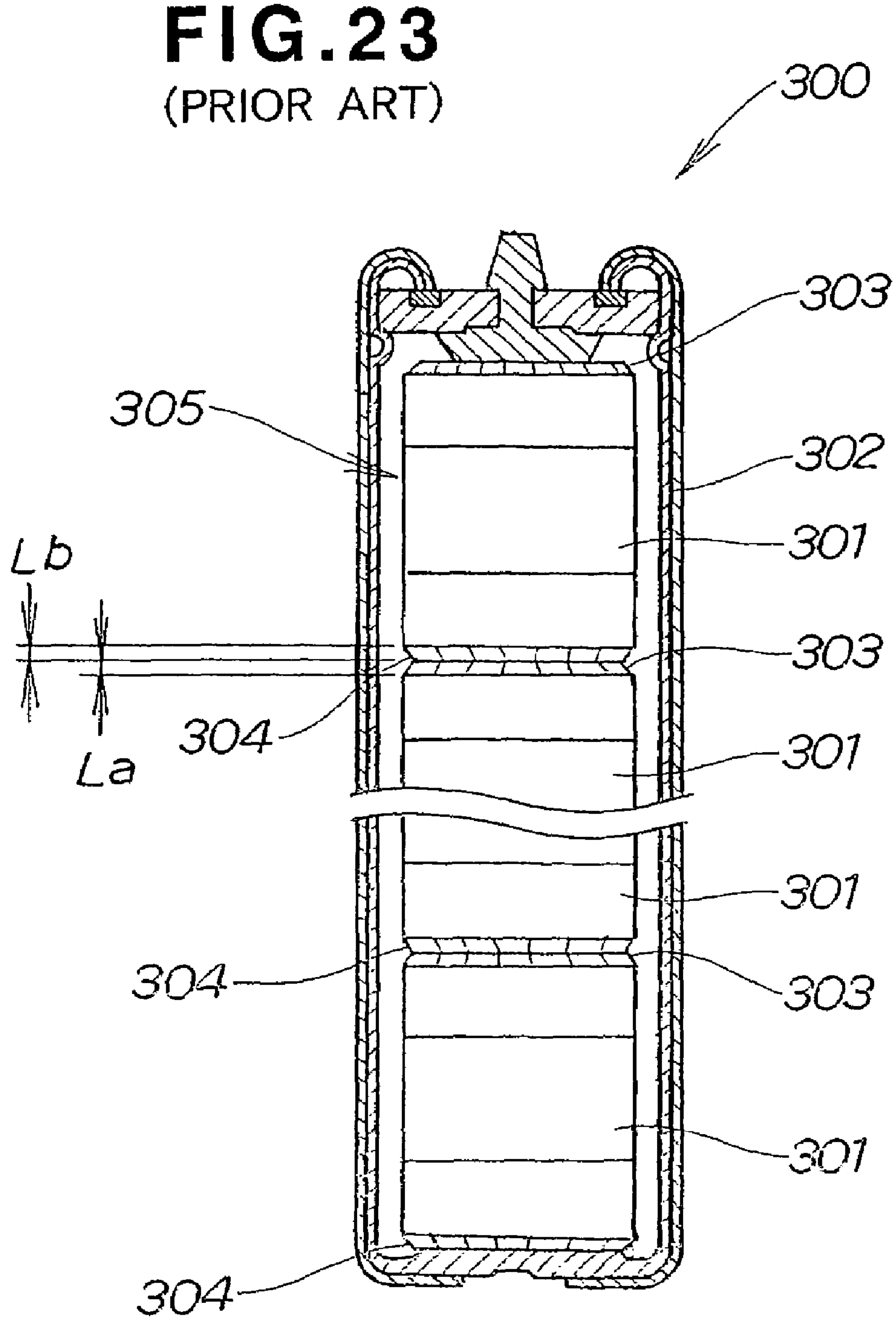
FIG. 23 is a view showing a cylindrical battery having a series accumulator cell connection structure of related art.

FIG. 22 shows a series accumulator cell connection structure of an eighth embodiment.

A cylindrical battery 220 of this eighth embodiment differs from the cylindrical battery 10 of the first embodiment only in that the wall 11*a* of the cylindrical container 11 is divided (for example into three parts), and the hollow core 31 is divided (for example into three parts), and the rest of the construction is the same as that of the first embodiment.

Specifically, the wall 11*a* of the cylindrical container 11 is divided between the top accumulator cell 33 and the middle accumulator cell 35 and divided between the middle accumulator cell 35 and the bottom accumulator cell 37.

Of the divided wall 11*a*, non-conducting members are provided in an upper location 221 at a level between the top accumulator cell 33 and the middle accumulator cell 35 and in a lower location 222 at a level between the middle accumulator cell 35 and the bottom accumulator cell 37.

Also, the hollow core 31 is divided between the top accumulator cell 33 and the middle accumulator cell 35 and divided between the middle accumulator cell 35 and the bottom accumulator cell 37.

And of the divided hollow core 31, non-conducting members are provided in an upper location 223 at a level between the top accumulator cell 33 and the middle accumulator cell 35 and in a lower location 224 at a level between the middle accumulator cell 35 and the bottom accumulator cell 37.

As the non-conducting members, for example polypropylene (PP), polyethylene (PE), polybutylene terephthalate (PBT) or polyphenylene sulfide (PPS) can be used.

By this means, as in the fifth embodiment, the top accumulator cell 33, the middle accumulator cell 35 and the bottom accumulator cell 37 are prevented from being electrically continuous with the cylindrical container 11 and the hollow core 31, and the top accumulator cell 33, the middle accumulator cell 35 and the bottom accumulator cell 37 are prevented from discharging through the cylindrical container 11 and the hollow core 31. Thus, the potentials of the top accumulator cell 33, the middle accumulator cell 35 and the bottom accumulator cell 37 can be kept uniform and dropping of the accumulated energy of the cylindrical battery 220 can be prevented.

In the embodiments described above, examples were described wherein three accumulator cells were connected in series as the series accumulator cell connection structure 30, 130, 135, 161, 170. However, the invention is not limited to this, and alternatively two or four or more accumulator cells may be connected in series.

And although in the embodiments described above examples were described wherein polarizing electrodes 48 consisting of activated carbon, a conducting material and a binder were provided on both sides of a collector foil to form positive electrode bodies and negative electrode bodies, there is no limitation to this, and it is also possible to provide a polarizing electrode 48 on one side of a collector foil to form the positive electrode bodies and negative electrode bodies.

Also, in the embodiment shown in FIG. 4 an example was described wherein one wind 61*a* (the hatched region) of the positive electrode body 61 of the first electrode sheet 83 is removed; one wind 62*a* (the hatched region) of the first bottom separator 62 of the first separator 88 is removed; one wind 54*a* (the hatched region) of the second extended electrode body 54 of the second electrode sheet 93 is removed; one wind 56*a* (the hatched region) of the second middle separator 56 of the second separator 97 is removed; and one wind 64*a* (the hatched region) of the second bottom separator 64 is removed. However, the parts to be removed from the first electrode sheet 33, the first separator 88, the second electrode sheet 93 and the second separator 97 can be freely chosen in accordance with the winding method of the first electrode sheet 83, the first separator 88, the second electrode sheet 93 and the second separator 97.

And although as the cylindrical battery 10 of the first embodiment shown in FIG. 1 an example was described wherein the top accumulator cell 33, the middle accumulator cell 35 and the bottom accumulator cell 37 were wound so that the 'first wind' and 'last wind' to the hollow core 31 each became negative poles, the poles of the first winds and last winds of the accumulator cells 33, 35 and 37 are not limited to this.

INDUSTRIAL APPLICABILITY

By connecting adjacent accumulator cells in series by using collector foils having twice the width of polarizing electrodes so that they are common to adjacent accumulator cells, an accumulator battery is made compact. An accumulator battery made compact like this can be used in various industries.

The invention claimed is:

1. An accumulator cell assembly having a plurality of accumulator cells connected in series, each of the accumulator cells comprising:

a collector foil;

a polarizing electrode, made of activated carbon, a conducting material and a binder, provided on at least one side of the collector foil and forming a positive electrode body or a negative electrode body;

a separator separating the positive electrode body and the negative electrode body; and a winding core for layering together and winding the collector foil, the polarizing electrode and the separator onto, wherein an extended collector foil having a width of at least twice the width of the polarizing electrode continues through adjacent accumulator cells and connects them in series.

2. An accumulator cell assembly according to claim 1, characterized in that a lead wire is connected to the extended collector foil to correct voltages of the accumulator cells individually.

3. An accumulator cell assembly according to claim 2, characterized in that the winding core is a hollow member and the lead wire is routed through the hollow part of the winding core.

4. An accumulator cell assembly according to claim 1, characterized in that the extended collector foil has a plurality of openings formed in a part thereof positioned between the accumulator cells.

5. An accumulator cell assembly according to claim 1, characterized in that the extended collector foil has undergone a water-repellency treatment on a part thereof positioned between the accumulator cells.

* * * * *